US012119556B2

(12) United States Patent
Varnoosfaderani et al.

(10) Patent No.: US 12,119,556 B2
(45) Date of Patent: Oct. 15, 2024

(54) BASE STATION ANTENNAS HAVING HIGH DIRECTIVITY RADIATING ELEMENTS WITH BALANCED FEED NETWORKS

(71) Applicant: Outdoor Wireless Networks LLC, Claremont, NC (US)

(72) Inventors: Mohammad Vatankhah Varnoosfaderani, Plano, TX (US); Peter J. Bisiules, LaGrange Park, IL (US); Bo Wu, Richardson, TX (US); Bin Sun, Suzhou (CN); YueMin Li, Suzhou (CN); Khanh Duy Tran, Rowlett, TX (US); Samantha Merta, Plano, TX (US)

(73) Assignee: Outdoor Wireless Networks LLC, Claremont, NC (US)

( * ) Notice: Subject to any disclaimer, the term of this patent is extended or adjusted under 35 U.S.C. 154(b) by 153 days.

(21) Appl. No.: 17/919,128

(22) PCT Filed: Mar. 22, 2021

(86) PCT No.: PCT/US2021/023469
§ 371 (c)(1),
(2) Date: Oct. 14, 2022

(87) PCT Pub. No.: WO2021/221824
PCT Pub. Date: Nov. 4, 2021

(65) Prior Publication Data

US 2023/0163486 A1 May 25, 2023

Related U.S. Application Data

(60) Provisional application No. 63/143,409, filed on Jan. 29, 2021, provisional application No. 63/016,605, filed on Apr. 28, 2020.

(51) Int. Cl.
*H01Q 21/26* (2006.01)
*H01Q 21/06* (2006.01)

(52) U.S. Cl.
CPC .......... *H01Q 21/26* (2013.01); *H01Q 21/062* (2013.01)

(58) Field of Classification Search
CPC .. H01Q 21/0006; H01Q 21/062; H01Q 21/24; H01Q 21/26; H01Q 9/065; H01Q 9/16
See application file for complete search history.

(56) References Cited

U.S. PATENT DOCUMENTS 6,028,563 A * 2/2000 Higgins ................ H01Q 1/246 343/810
6,313,809 B1 11/2001 Gabriel et al.
(Continued)

FOREIGN PATENT DOCUMENTS

CN 203644953 U 6/2014

OTHER PUBLICATIONS

"International Search Report and Written Opinion of the International Searching Authority", International Application No. PCT/US2021/023469, Jul. 12, 2021, 14 pp.
(Continued)

*Primary Examiner* — Jason M Crawford
(74) *Attorney, Agent, or Firm* — Myers Bigel, P.A.

(57) ABSTRACT

A radiating element includes a feed stalk and first through fourth dipole arms. An outer segment of the first dipole arm and an outer segment of the second dipole arm are configured to together form a first radiating structure that radiates at a first polarization, an outer segment of the third dipole arm and an outer segment of the fourth dipole arm are configured to together form a second radiating structure that radiates at the first polarization, and first and second inner portions of each of the first through fourth dipole arms are
(Continued)

configured to together form a third radiating structure that radiates at the first polarization when a first RF signal is fed to the radiating element.

19 Claims, 20 Drawing Sheets

(56) References Cited

U.S. PATENT DOCUMENTS

| | | | | |
|---|---|---|---|---|
| 9,711,871 | B2 * | 7/2017 | Jones | H01Q 21/28 |
| 10,128,579 | B2 * | 11/2018 | Wu | H01Q 9/16 |
| 11,476,585 | B1 * | 10/2022 | Abdelmonem | H01Q 21/26 |
| 11,817,629 | B2 * | 11/2023 | Zhu | H01Q 1/246 |
| 2010/0182213 | A1 | 7/2010 | Obermaier et al. | |
| 2015/0070234 | A1 * | 3/2015 | Jones | H01Q 21/28 343/797 |
| 2015/0295313 | A1 * | 10/2015 | Zimmerman | H01Q 5/50 343/810 |
| 2016/0248170 | A1 * | 8/2016 | Bisiules | H01Q 5/42 |
| 2017/0062952 | A1 * | 3/2017 | Sundararajan | H01Q 1/246 |
| 2018/0323513 | A1 * | 11/2018 | Varnoosfaderani | H01Q 21/062 |
| 2020/0067197 | A1 * | 2/2020 | Tang | H01Q 9/285 |
| 2021/0344122 | A1 * | 11/2021 | Kaistha | H01Q 19/108 |
| 2022/0263248 | A1 * | 8/2022 | Tang | H01Q 1/246 |
| 2022/0285857 | A1 * | 9/2022 | Pollayi | H01Q 21/24 |
| 2023/0059532 | A1 * | 2/2023 | Li | H01Q 21/26 |
| 2023/0110891 | A1 * | 4/2023 | Tang | H01Q 21/26 342/372 |
| 2023/0163486 | A1 * | 5/2023 | Varnoosfaderani | H01Q 25/001 343/797 |
| 2023/0361475 | A1 * | 11/2023 | Sun | H01Q 1/246 |

OTHER PUBLICATIONS

Sun, Hai-Han, et al., "Suppression of Cross-Band Scattering in Multiband Antenna Arrays", IEEE Transactions on Antennas and Propagation, vol. 67, No. 4, Apr. 2019, pp. 2379-2389.

* cited by examiner

BASE STATION ANTENNAS HAVING HIGH DIRECTIVITY RADIATING ELEMENTS WITH BALANCED FEED NETWORKS

RELATED APPLICATION(S)

The present application is a 35 U.S.C. § 371 national stage application of PCT Application No. PCT/US2021/023469, filed on Mar. 22, 2021, which itself claims priority to and the benefit of U.S. Provisional Application Ser. No. 63/016,605, filed Apr. 28, 2020, and U.S. Provisional Application Ser. No. 63/143,409, filed Jan. 29, 2021, the disclosures of which are hereby incorporated herein in their entireties.

BACKGROUND

The present invention generally relates to radio communications and, more particularly, to radiating elements for base station antennas used in cellular communications systems.

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station. In many cases, each base station is divided into "sectors." In perhaps the most common configuration, a hexagonally shaped-cell is divided into three 120° sectors, and each sector is served by one or more base station antennas. Typically, the base station antennas are mounted on a tower or other raised structure, with the radiation patterns (also referred to as "antenna beams") that are generated by the base station antennas directed outwardly. Base station antennas are often implemented as linear or planar phased arrays of radiating elements.

In order to accommodate the ever-increasing volume of cellular communications, cellular operators have added cellular service in a variety of new frequency bands. Cellular operators have applied a variety of approaches to support service in these new frequency bands, including deploying linear arrays of "wide-band" radiating elements that provide service in multiple frequency bands, and/or deploying multiband base station antennas that include multiple linear arrays (or planar arrays) of radiating elements that support service in different frequency bands. One very common multiband base station antenna design includes two linear arrays of "low-band" radiating elements that are used to provide service in some or all of the 694-960 MHz frequency band and four linear arrays of "high-band" radiating elements that are used to provide service in some or all of the 1427-2690 MHz frequency band. These linear arrays are mounted in side-by-side fashion. Unfortunately, implementing an antenna that includes all six of these linear arrays while maintaining the width of the antenna within acceptable limits and limiting undesirable interactions between the linear arrays may be difficult.

SUMMARY

Pursuant to embodiments of the present invention, radiating elements are provided that comprise a feed stalk and a first dipole arm, a second dipole arm, a third dipole arm and a fourth dipole arm that are each electrically coupled to the feed stalk. An outer segment of the first dipole arm and an outer segment of the second dipole arm are configured to together form a first radiating structure that radiates at a first polarization, and an outer segment of the third dipole arm and an outer segment of the fourth dipole arm are configured to together form a second radiating structure that radiates at the first polarization, and first and second inner portions of each of the first through fourth dipole arms are configured to together form a third radiating structure that radiates at the first polarization when a first RF signal is fed to the radiating element.

In some embodiments, the feed stalk may include a first RF transmission line, a second RF transmission line, a third RF transmission line, and a fourth RF transmission line. In some embodiments, at least a part of each of the first through RF transmission lines may comprise a respective stripline segment.

In some embodiments, a portion of the first dipole arm may extend adjacent to and in parallel to a portion of the second dipole arm to define a first slot, a portion of the second dipole arm may extend adjacent to and in parallel to a portion of the third dipole arm to define a second slot, a portion of the third dipole arm may extend adjacent to and in parallel to a portion of the fourth dipole arm to define a third slot, and a portion of the fourth dipole arm may extend adjacent to and in parallel to a portion of the first dipole arm to define a fourth slot.

In some embodiments, the first through fourth RF transmission lines, when excited, may be configured to apply voltage differentials across the respective first through fourth slots.

In some embodiments, the radiating element may be mounted on a reflector of a base station antenna, and the first and third dipole arms may be mounted to extend horizontally in front of the reflector and the second and fourth dipole arms may be mounted to extend vertically in front of the reflector when a longitudinal axis of the reflector extends in a vertical direction. The first and third slots may extend at an angle of about −45° with respect to the longitudinal axis of the reflector and the second and fourth slots may extend at an angle of about +45° respect to the longitudinal axis of the reflector.

In some embodiments, the first RF transmission line may extend directly behind the first slot, the second RF transmission line may extend directly behind the second slot, the third RF transmission line may extend directly behind the third slot, and the fourth RF transmission line may extend directly behind the fourth slot.

In some embodiments, a first conductor of the first RF transmission line may capacitively couple to the first dipole arm on a first side of the slot and the second conductor of the first RF transmission line may capacitively couple to a second side of the second dipole arm.

In some embodiments, each of the first through fourth RF transmission lines may partially cross behind a respective one of the first through fourth slots.

In some embodiments, each of the first through fourth RF transmission lines may partially cross behind a respective one of the first through fourth slots within a footprint of the feed stalk when the radiating element is viewed from the front.

Pursuant to further embodiments of the present invention, a radiating element is provided that comprises a first dipole arm, a second dipole arm, a third dipole arm and a fourth dipole arm arranged to form a cruciform shape, where first through fourth slots separate each of the first through fourth dipole arms from adjacent ones of the first through fourth dipole arms and a feed network that includes a first stripline segment, a second stripline segment, a third stripline segment, and a fourth stripline segment. Center conductors of the respective first through fourth stripline segments extend directly behind the respective first through fourth slots.

In some embodiments, the first through fourth dipole arms may be capacitively coupled to the center conductors of the respective first through fourth stripline segments, and the first through fourth dipole arms may also be capacitively coupled to ground.

In some embodiments, center conductors of the respective first through fourth stripline segments may capacitively couple to the respective first through fourth dipole arms along the inner half of the respective first through fourth slots.

In some embodiments, the radiating element may be mounted on a reflector of a base station antenna, and the first and third dipole arms may be mounted to extend horizontally in front of the reflector and the second and fourth dipole arms may be mounted to extend vertically in front of the reflector when a longitudinal axis of the reflector extends in a vertical direction. In such embodiments, the first and third slots may extend at an angle of about −45° with respect to the longitudinal axis of the reflector and the second and fourth slots may extend at an angle of about +45° respect to longitudinal axis of the reflector.

In some embodiments, the first through fourth dipole arms may each include first and second inner segments that together define the first through fourth slots, first and second outer segments that extend outwardly from distal ends of the respective first and second inner segments, and a third outer segment that connects distal ends of the first and second outer segments. In some embodiments, the first and second outer segments of each of the first through fourth dipole arms may extend in parallel to each other. In some embodiments, the third outer segments of each of the first through fourth dipole arms may extend at a 900 angle from the second outer segment.

In some embodiments, a base of each of the first through fourth dipole arms and a distal portion each of the first through fourth dipole arms may all lie in a common plane.

Pursuant to still further embodiments of the present invention, radiating elements are provided that comprise a first dipole arm, a second dipole arm, a third dipole arm and a fourth dipole arm and a feed stalk that includes a first RF transmission line that includes a first microstrip segment and a first stripline segment and a second RF transmission line that includes a second microstrip segment and a second stripline segment.

In some embodiments, these radiating element may further include a third RF transmission line that includes a third microstrip segment and a third stripline segment and a fourth RF transmission line that includes a fourth microstrip segment and a fourth stripline segment.

In some embodiments, the radiating element may be mounted to extend forwardly from a reflector of a base station antenna, and the first and second microstrip segments may be behind the reflector and the first and second stripline segments may be in front of the reflector.

In some embodiments, the radiating element may further include a first power divider having a first output that comprises the first microstrip segment and a second output that comprises the second microstrip segment. In some embodiments, the radiating element may also include a second power divider having a first output that comprises the third microstrip segment and a second output that comprises the fourth microstrip segment.

In some embodiments, a first coaxial cable may comprise the input to the first power divider.

In some embodiments, the feed stalk may include four sets of first and second parallel metal plates that form ground conductors of the first through fourth stripline segments.

In some embodiments, a first metal plate of each of the four sets of parallel metal plates may extend farther rearwardly than a second metal plate of each of the four sets of parallel metal plates.

In some embodiments, first through fourth metal pads may be provided at the front of the feed stalk that extend perpendicularly to the four sets of first and second parallel metal plates.

DETAILED DESCRIPTION

Figure 1A:
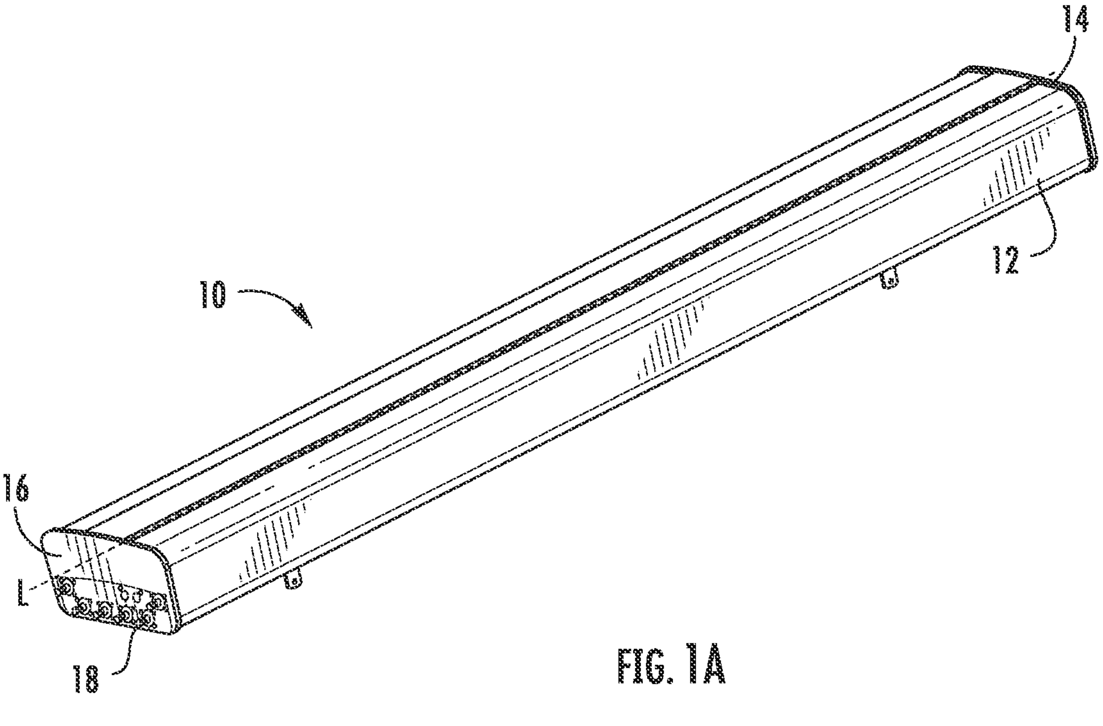
FIG. 1A is a side perspective view of a base station antenna according to embodiments of the present invention.

Pursuant to embodiments of the present invention, dual-polarized, high directivity radiating elements are provided that include four dipole arms that are mounted on a feed stalk. The four dipole arms may be arranged in a cruciform shape and may be fed via four slots that are defined between adjacent dipole arms. These radiating elements may be inexpensive to manufacture, easy to assemble, and may be designed with cloaking features so that they are relatively invisible to other nearby radiating elements that operate in different frequency bands. In some embodiments, the radiating elements may be formed of stamped sheet metal and may be directly fed by pairs of feed cables without any need for a feed board printed circuit board.

In some embodiments, the radiating elements may include three separate radiating structures that each are configured to radiate at two different polarizations in response to appropriate RF feed signals. In some embodiments, an outer segment of the first dipole arm and an outer segment of the second dipole arm are configured to together form a first radiating structure that radiates at a first polarization, while an outer segment of the third dipole arm and an outer segment of the fourth dipole arm are configured to together form a second radiating structure that radiates at the first polarization. In addition, first inner portions of the first and third dipole arms and second inner portions of the second and fourth dipole arms are configured to together form a third radiating structure that radiates at the first polarization. The provision of three radiating structures may increase the directivity of the radiating element.

In some embodiments, the feed stalk may include first through fourth RF transmission lines that feed the respective first through fourth slots that are defined between the dipole arms. The first and third RF transmission lines may be coupled to a first coaxial feed cable through a first power divider, and the second and fourth RF transmission lines may be coupled to a second coaxial feed cable through a second power divider. The first and third RF transmission lines and the first power divider may be configured to split an RF signal injected from the first coaxial feed cable into two equal magnitude sub-components and to feed those sub-components to the first and third slots in-phase. Similarly, the second and fourth RF transmission lines and the second power divider may be configured to split an RF signal injected from the second coaxial feed cable into two equal magnitude sub-components and to feed those sub-components to the second and fourth slots in-phase. The dipole arms of the radiating element may be fed without the use of any balun.

In some embodiments, the feed stalk may include both stripline and microstrip RF transmission lines. For example, the feed stalk may include a first RF transmission line that includes a first microstrip segment and a first stripline segment, a second RF transmission line that includes a second microstrip segment and a second stripline segment, a third RF transmission line that includes a third microstrip segment and a third stripline segment and a fourth RF transmission line that includes a fourth microstrip segment and a fourth stripline segment. The stripline segments may extend forwardly from the reflector to a radiator unit of the radiating element. The microstrip segments may be positioned behind the reflector. The feed stalk may also include first and second power dividers. The power dividers may be implemented in the microstrip segments of the first through fourth RF transmission lines. In some embodiments, the first and third microstrip segments may comprise a first monolithic section of microstrip transmission line and the center conductor of the first coaxial feed cable may connect to the first monolithic section of microstrip transmission line to form the first power divider and to divide the first monolithic section of microstrip transmission line into the first and third microstrip segments. Similarly, the second and fourth microstrip segments may comprise a second monolithic section of microstrip transmission line and the center conductor of the second coaxial feed cable may connect to the second monolithic section of microstrip transmission line to form the second power divider and to divide the second monolithic section of microstrip transmission line into the second and fourth microstrip segments.

In some embodiments, the first through fourth stripline segments of the RF transmission lines may extend directly behind the respective first through fourth slots. The first through fourth stripline segments may capacitively couple to the respective first through fourth dipole arms. Center conductors of the respective first through fourth stripline transmission lines may capacitively couple to the respective first through fourth dipole arms along the inner half of the respective first through fourth slots (i.e., in the central portion of the radiating element).

In some embodiments, the dipole arms may be formed of stamped sheet metal, and plate capacitors may be implemented in the dipole arms. Additionally, one or more shunt inductor-capacitor ("L-C") circuits may be coupled in series with the plate capacitors. The plate capacitor and the shunt L-C circuit may together for a band stop filter may allow RF signals in the operating frequency band of the radiating element to flow along the dipole arms while blocking RF signals in other frequency bands from flowing on the dipole arms. Such a design may be used to make the dipole arms substantially invisible to RF signals in the operating frequency band of other nearby radiating elements and/or may widen the impedance matching bandwidth of the radiating element.

Embodiments of the present invention will now be discussed in greater detail with reference to the accompanying figures.

Figure 1B:
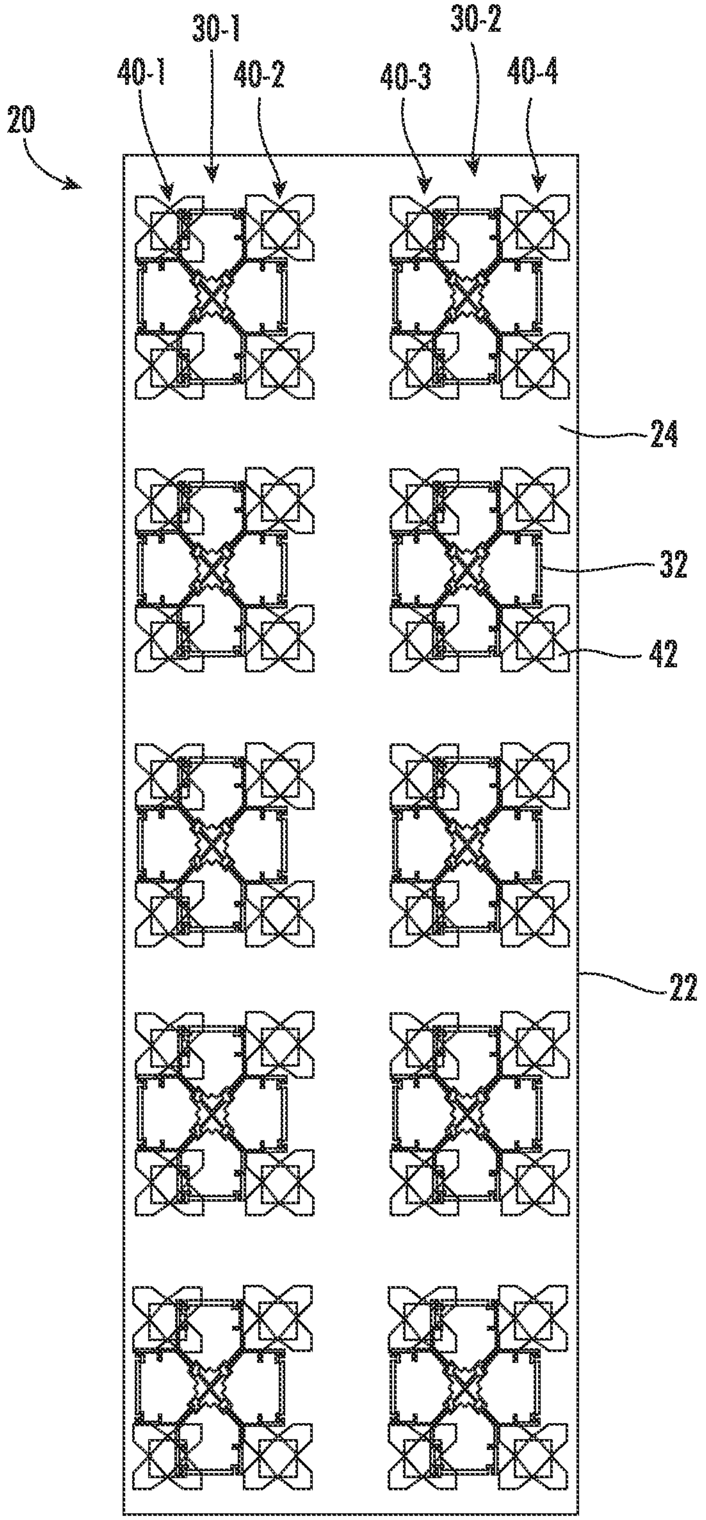
FIG. 1B is a schematic front view of the base station antenna of FIG. 1A with the radome removed.

FIGS. 1A and 1B illustrate a base station antenna 10 according to certain embodiments of the present invention. FIG. 1A is a schematic front perspective view of the base station antenna 10, while FIG. 1B is a front view of the antenna 10 with the radome thereof removed to illustrate the inner components of the antenna, As shown in FIG. 1A, the base station antenna 10 is an elongated structure that extends along a longitudinal axis L. The base station antenna 10 may have a tubular shape with generally rectangular cross-section. The antenna 10 includes a radome 12 and a top end cap 14, which may or may not be integral with the radome 12. The antenna 10 also includes a bottom end cap 16 which includes a plurality of RF connectors 18 mounted therein that are used to pass RF signals to and from the arrays of radiating elements included in base station antenna 10. The antenna 10 is typically mounted in a vertical configuration (i.e., the longitudinal axis L may be generally perpendicular to a plane defined by the horizon when the antenna 10 is mounted for normal operation).

As shown in FIG. 1B, the base station antenna 10 includes an antenna assembly 20 that may be slidably inserted into the radome 12. The antenna assembly 20 includes a backplane 22 that includes a metallic surface that may serve as both a reflector 24 and as a ground plane for the radiating elements of the antenna 10. Various mechanical and electronic components of the antenna (not shown) may be mounted behind the backplane 22 such as, for example, phase shifters, remote electronic tilt ("RET") units, mechanical linkages, a controller, diplexers, and the like.

A plurality of dual-polarized low-band radiating elements 32 and a plurality of dual-polarized high-band radiating elements 42 are mounted to extend forwardly from the reflector 24. As shown in FIG. 1B, the low-band radiating elements 32 are mounted in two vertical columns to form first and second linear arrays 30-1, 30-2 of low-band radiating elements 32, and the high-band radiating elements 42 are mounted in four vertical columns to form firth through fourth linear arrays 40-1 through 40-4 of high-band radiating elements 42. Note that herein when multiple like elements are provided, the elements may be identified by two-part reference numerals. The full reference numeral (e.g., linear array 40-2) may be used to refer to an individual element, while the first portion of the reference numeral (e.g., the linear arrays 40) may be used to refer to the elements collectively. Each linear array 30 of low-band radiating elements 32 may be positioned between two of the linear arrays 40 of high-band radiating elements 42. Since dual-polarized radiating elements 32, 42 are used, each linear array 30, 40 may form a pair of antenna beams, namely a first antenna beam having a +45° polarization and a second antenna beam having a −45° polarization.

The low-band radiating elements 32 may be configured to transmit and receive RF signals in a first frequency band. In some embodiments, the first frequency band may comprise the 694-960 MHz frequency range or a portion thereof. The high-band radiating elements 42 may be configured to transmit and receive signals in a second frequency band. In some embodiments, the second frequency band may comprise the 1427-2690 MHz frequency range or a portion thereof. It will be appreciated that the number of linear arrays of radiating elements may be varied from what is shown in FIG. 1B, as may the number of radiating elements per linear array, the positions of the linear arrays, the operating frequency bands of the linear arrays, and/or the types of radiating elements included in the linear arrays.

Figure 2:
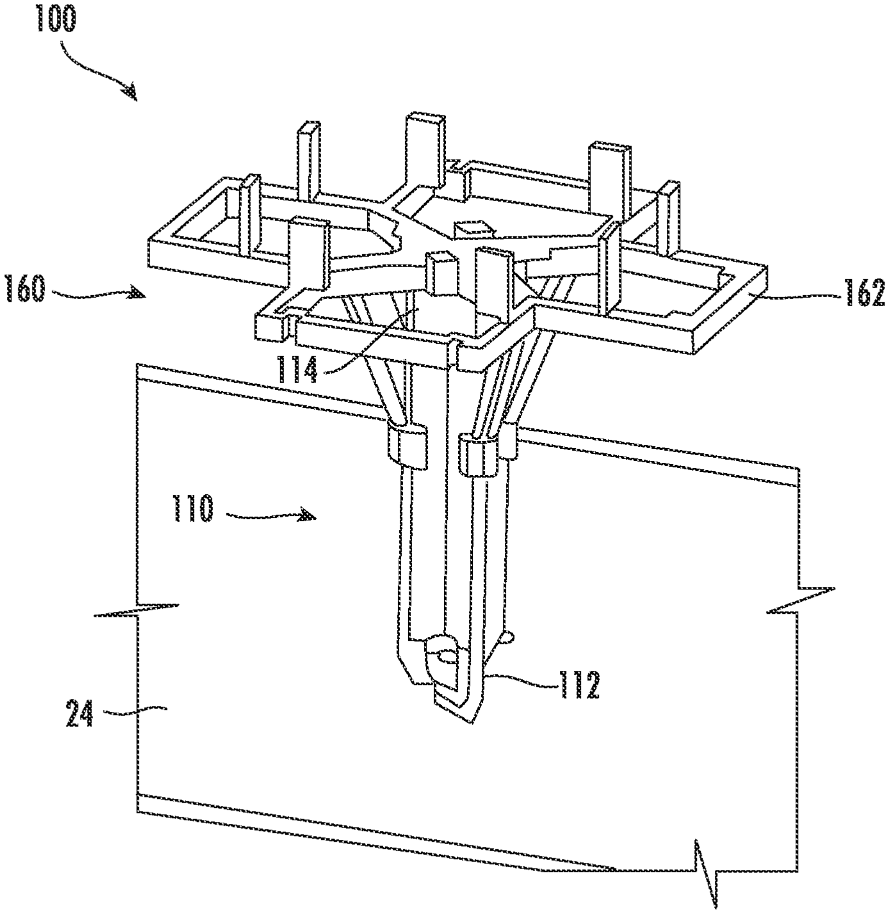
FIG. 2 is a perspective view of a low-band radiating element according to embodiments of the present invention that may be included in the base station antenna of FIGS. 1A-1B.

As noted above, embodiments of the present invention provide low cost, high directivity radiating elements that may be used, for example, to implement each of the dual-polarized low-band radiating elements 32 shown in FIG. 1B. FIG. 2 is a perspective view of a dual-polarized radiating element 100 that may be used to implement each of the dual-polarized low-band radiating elements 32 shown in FIG. 1B.

As shown in FIG. 2, the dual-polarized radiating element 100 includes a feed stalk 110 and a radiator unit 160. The feed stalk includes a base 112 which may extend through and behind the reflector 24 of base station antenna 100 and a distal end 114 which is positioned forwardly of the reflector 24. The feed stalk 110 may be mounted so that a longitudinal axis of the feed stalk 110 is perpendicular to the reflector 24. The radiating element 100 is schematically depicted in FIG. 2 as being in front of the reflector 24, and it will be appreciated that in FIG. 2 the radiating element 100 is not shown in its mounted position where the base 112 of the feed stalk 110 extends through an opening (not shown) in the reflector 24 so that the entire radiating element may be illustrated in the figure.

The radiator unit 160 includes first through fourth dipole arms 170-1 through 170-4 and a dielectric support 162. Each dipole arm 170 may be formed of stamped sheet metal in some embodiments, although other implementations are possible (e.g., forming the dipole arms 170 on a printed circuit board). The dipole arms 170 are arranged to define a cruciform shape when the radiating element 100 is viewed from the front (which, in the orientation of FIG. 2, corresponds to being viewed from above).

Figure 3A:
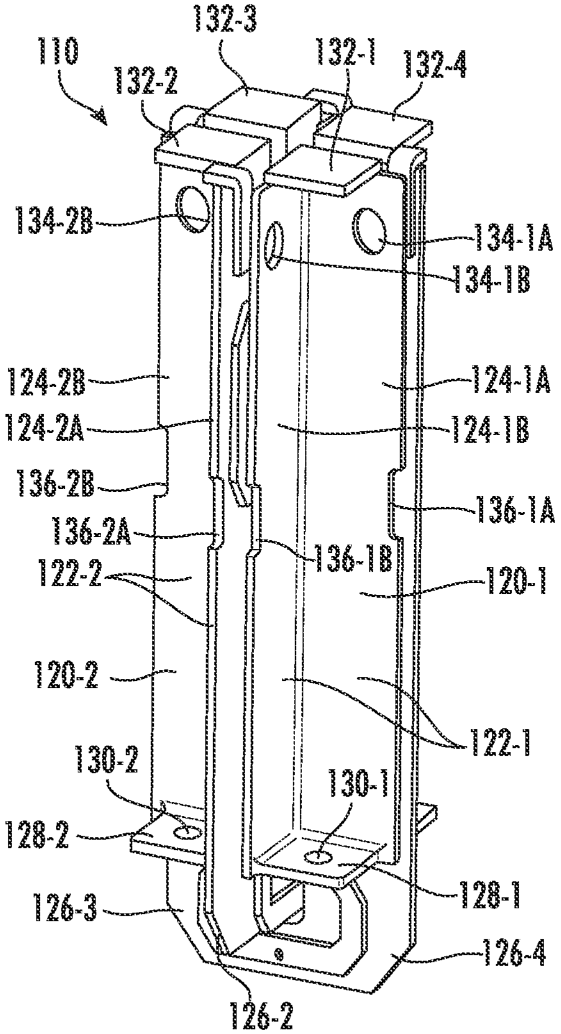
FIGS. 3A and 3B are side perspective views of the feed stalk of the radiating element of FIG. 2.
Figure 3B:
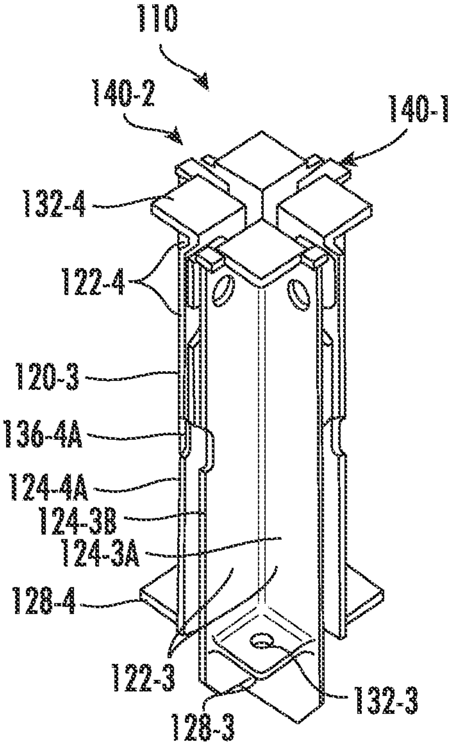
Figure 3C:
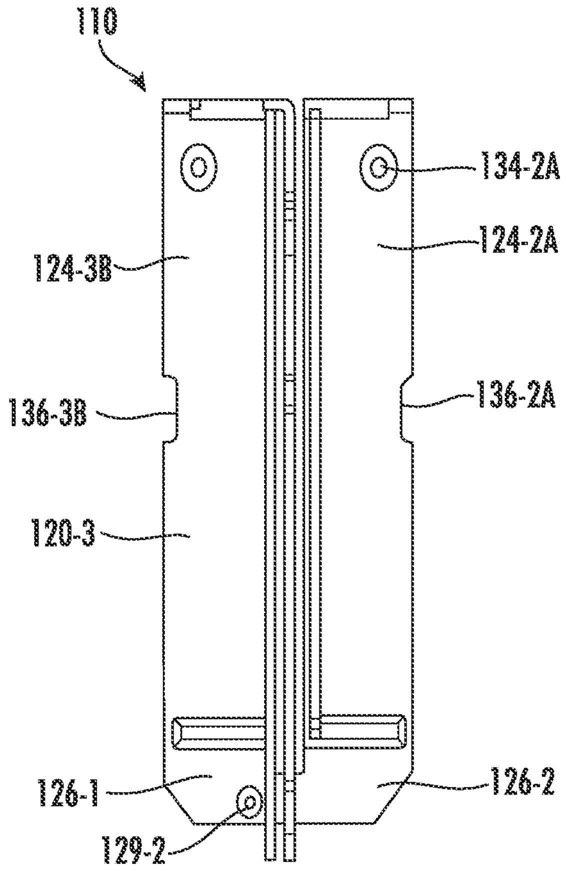
FIGS. 3C and 3D are side views of the feed stalk of the radiating element of FIG. 2.
Figure 3D:
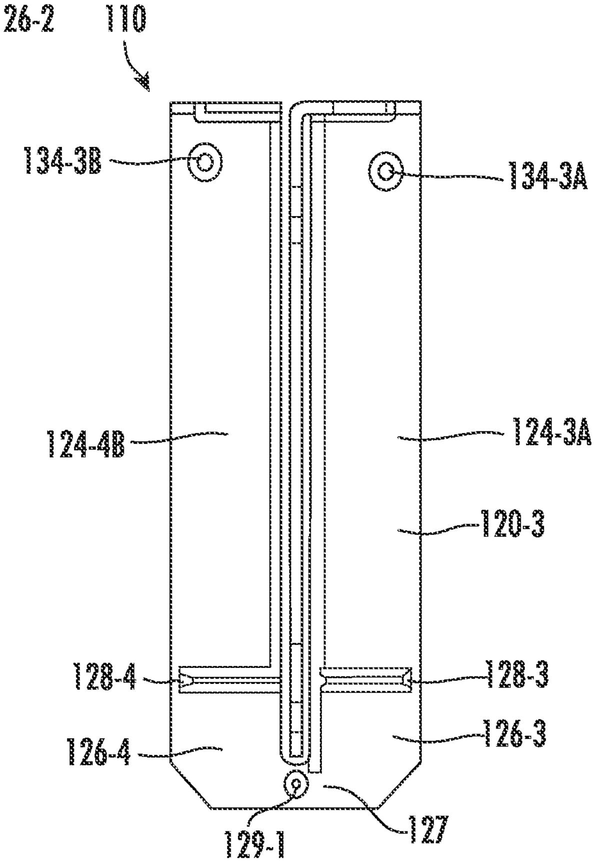
Figure 3E:
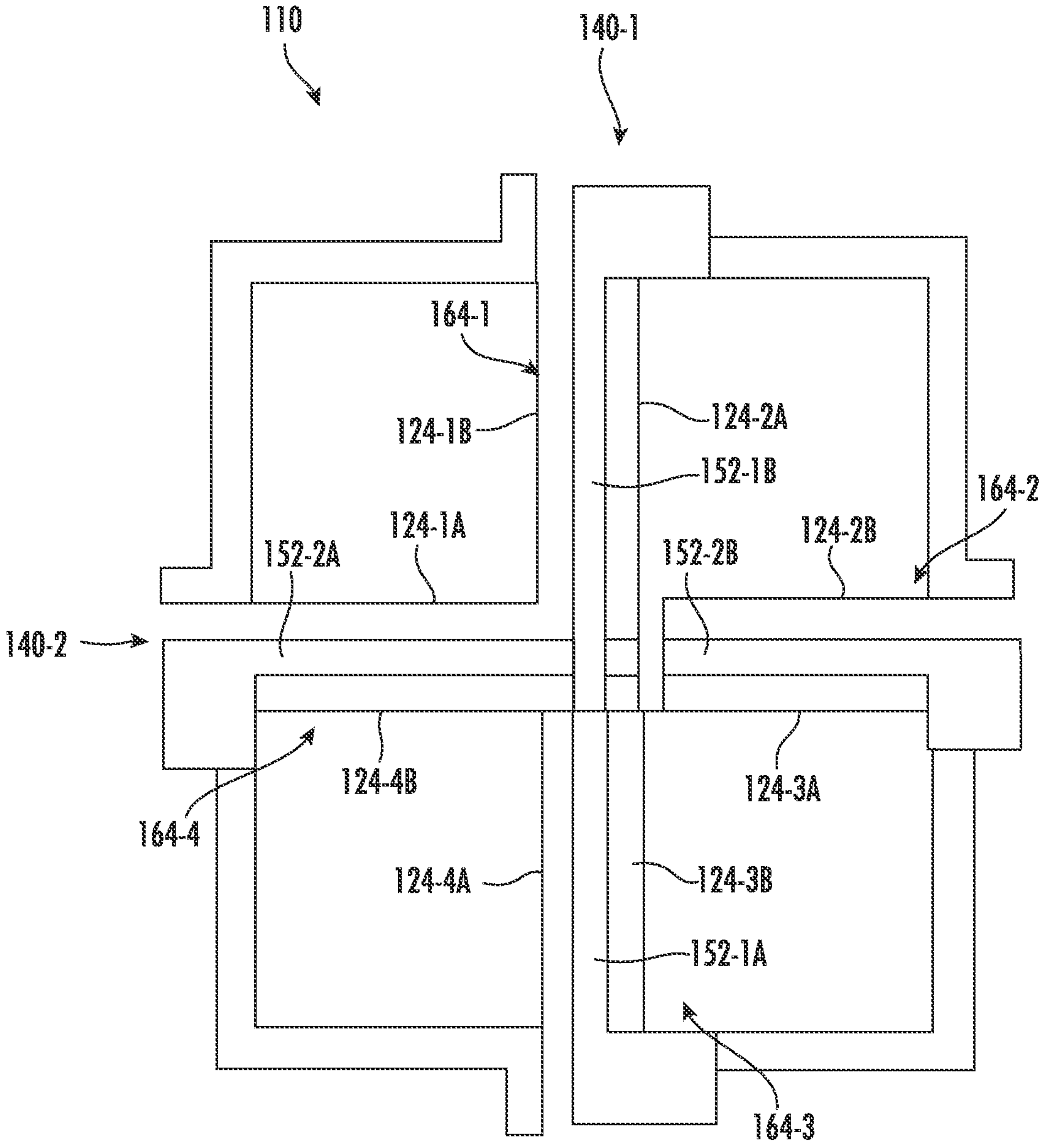
FIG. 3E is a front view of the feed stalk of the radiating element of FIG. 2.
Figure 3F:
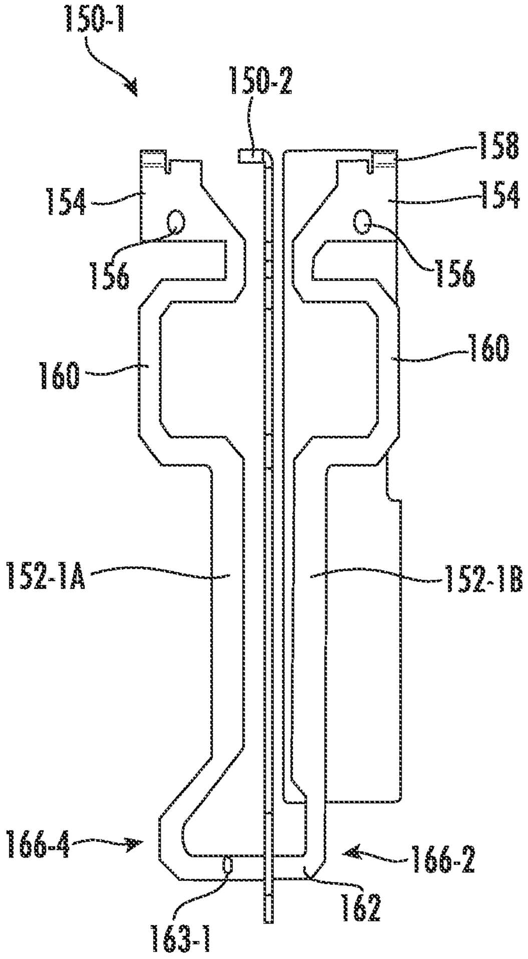
FIGS. 3F and 3G are cut-away side views that show the feed lines of the feed stalk of the radiating element of FIG. 2.
Figure 3G:
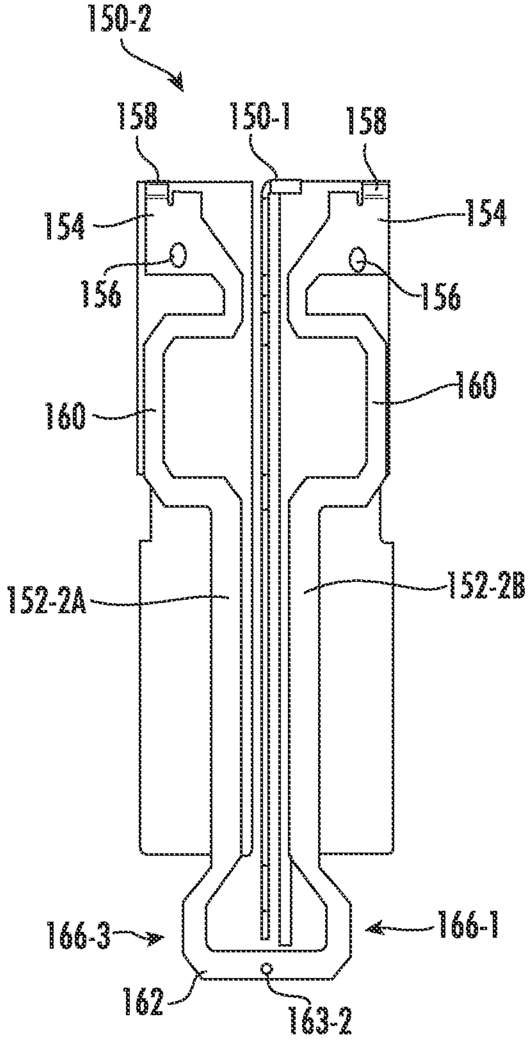

FIGS. 3A-3G illustrate the design of the feed stalk 112 in greater detail. In particular, FIGS. 3A and 3B are side perspective views of the feed stalk 110, and FIGS. 3C and 3D are side views of the feed stalk 110. FIG. 3E is a front view of the feed stalk 110, and FIGS. 3F and 3G are cut-away side views that illustrate the feed lines 150-1, 150-2 that are disposed in the interior of the feed stalk 110.

In the embodiment depicted in FIGS. 3A-3G, the feed stalk 110 includes a total of five metal pieces, namely three stalk members 120-1 through 120-3 and two feed lines 150-1, 150-2. It will be appreciated, however, that more or fewer stalk members 120 and/or feed lines 150 may be included in other embodiments, as will be discussed in further detail below. In the depicted embodiment, the stalk members 120 may be die cast or machined parts. It will be appreciated, however, that stamped and bent sheet metal may be used to form the stalk members 120 in other embodiments.

Referring to FIG. 3A, the first stalk member 120-1 includes a first pair 122-1 of forwardly extending metal sheets 124-1A, 124-1B that are arranged perpendicular to each other. Sheets 124-1A and 124-1B are physically connected to each other, but it will be appreciated that two separate sheets could be used in other embodiments. A plate 128-1 having an opening 130-1 extends at a right angle from the rear portion of sheets 124-1A, 124-1B. The plate 128-1 may be used to mount the first stalk member 120-1 to the reflector 24 of base station antenna 100 using a bolt or rivet (not shown). The plate 128-1 may be connected to either or both of the sheets 124-1A, 124-1B. A plate 132-1 extends at a right angle from the forward portion of sheets 124-1A, 124-1B. The plate 132-1 may capacitively couple with a corresponding plate on a first of the dipole arms 170-1, as will be discussed in greater detail below. The plate 132-1 may be connected to either or both of the sheets 124-1A, 124-1B. Openings 134-1A, 134-1B are provided near the forward end of sheets 124-1A, 124-1B, respectively. The openings 134-1A, 134-1B may receive respective rivets that are used to mount the feed lines 150-1, 150-2 within the interior of the feed stalk 110. Finally, the outer central portion of each sheet 124-1A, 124-1B includes a respective recess 136-1A, 136-1B. The recesses 136-1A, 136-1B may be used ensure that the dielectric support 162 is mounted in the proper location on the feed stalk 110.

Referring to FIGS. 3A-3C, the second stalk member 120-2 includes a second pair 122-2 of forwardly extending metal sheets 124-2A, 124-2B that are arranged perpendicular to each other. Sheets 124-2A and 124-2B are physically connected to each other, but need not be. A plate 128-2 having an opening 130-2 extends at a right angle from the rear portion of sheets 124-2A, 124-2B, and a plate 132-2 extends at a right angle from the forward portion of sheets 124-2A, 124-2B. The design and function of plates 128-2 and 132-2 may be the same as the design and function of plates 128-1 and 132-1, and hence further description thereof will be omitted. Openings 134-2A, 134-2B and recesses 136-2A, 136-2B are provided in sheets 124-2A, 124-2B, respectively, which may be identical in design and function to the openings 134-1A, 134-1B and recesses 136-1A, 136-1B in sheets 124-1A, 124-1B, and hence further description thereof will be omitted. As best seen in FIG. 3C, sheet 124-2A extends farther rearwardly than does sheet 124-2A, so that sheet 124-2A includes an extension 126-2 that extends rearwardly of plate 128-2. As can best be seen in FIGS. 3C and 3E, the extension 126-2 may also extend through an axis that bisects the feed stalk 110 when viewed from the front.

Referring to FIGS. 3A-3D, the third stalk member 120-3 includes a third pair 122-3 of forwardly extending metal sheets 124-3A, 124-3B and a fourth pair 122-4 of forwardly extending metal sheets 124-4A, 124-4B. Sheets 124-3A, 124-3B, 124-4A and 124-4B are all implemented as a single monolithic unit in the depicted embodiment, although embodiments of the present invention are not limited thereto. As shown in FIG. 3B, a plate 128-3 having an opening 130-3 extends at a right angle from the rear portion of sheets 124-3A, 124-3B, and a plate 132-3 extends at a right angle from the forward portion of sheets 124-3A, 124-3B. Similarly, a plate 128-4 having an opening (not visible in the figures) extends at a right angle from the rear portion of sheets 124-4A, 124-4B, and a plate 132-4 extends at a right angle from the forward portion of sheets 124-4A, 124-4B. The design and function of plates 128-3, 128-4, 132-3 and 132-4 may be the same as the design and function of plates 128-1 and 132-1, and hence further description thereof will be omitted. Openings 134-3A, 134-3B; 134-4A, 134-4B and recesses 136-3A, 136-3B; 136-4A, 136-4B are provided in sheets 124-3A, 124-3B; 124-4A, 124-4B, respectively, which may be identical in design and function to the openings 134-1A, 134-1B and recesses 136-1A, 136-1B in sheets 124-1A, 124-1B.

Sheets 124-3A, 124-3B, 124-4A and 124-4B each extend farther rearwardly than does sheet 124-2A, so that sheets 124-3A, 124-3B extend rearwardly past plate 128-3, and so that sheets 124-4A, 124-4B extend rearwardly past plate 128-4. As best seen in FIG. 3D, sheets 124-3A and 124-4B each extend farther rearwardly than do sheets 124-3B and 124-4A, respectively, so that sheet 124-3A includes an extension 126-3 that extends rearwardly of plate 128-3 and sheet 124-4B includes an extension 126-4 that extends rearwardly of plate 128-4. Extensions 126-3 and 126-4 are joined together through a connecting section 127 that is behind a channel 140-2 (which is discussed in further detail below). A first opening 129-1 is provided through connecting section 127, and a dielectric gasket that includes an opening is positioned in the first opening 129-1. Similarly, a second opening 129-2 is provided through extension 126-1, and a dielectric gasket that includes an opening is positioned in the second opening 129-2.

Each of the four pairs 122-1 through 122-4 of sheets 124 are positioned in one of four quadrants of a square when the feed stalk 110 is viewed from the front, as is best shown in FIG. 3E. Each pair 122 faces two other of the pairs 122 and is positioned diagonally with respect to the third pair 122. The sheets 124 are spaced apart from one another, with each sheet 124 of a pair 122 being positioned parallel to sheets 124 of the two other facing pairs 122. In particular, sheets 124-1A and 124-4B extend in parallel, sheets 124-1B and 124-2A extend in parallel, sheets 124-2B and 124-3A extend in parallel, and sheets 124-3B and 124-4A extend in parallel.

First and second channels 140-1, 140-2 bisect the feed stalk 110. Channel 140-1 is perpendicular to channel 140-2. The channel slot 140-1 is defined by parallel sheets 124-1B and 124-2A and 124-3B and 124-4A, and the second channel 140-2 is defined by parallel sheets 124-1A and 124-4B and 124-2B and 124-3A. In the depicted embodiment, the channels 140-1, 140-2 extend the full length of the feed stalk 110 (although the lateral extensions 126 do cross the channels 140).

The feed lines 150-1, 150-2 are best illustrated in FIGS. 3F and 3G. Each feed line 150 may comprise an elongated piece of stamped sheet metal that has a general U-shape. The "arms" 152-1A, 152-1B, 152-2A, 152-2B of each feed line 150 extend in the longitudinal direction of the feed stalk 110 (i.e., from front-to-rear). The forward end of each arm 152 includes a respective widened plate-like section 154 that includes a respective opening 156 therethrough. The plates 154 act as a mechanical support structure for a rivet or other fastener that may be used to control the gaps between the feed lines 150 and the sheets 124 that form the outer walls of the stripline structure with the feedlines sandwiched in between. The forward end of each arm 152 further includes a tab 158 that extends at a right angle from its associated plate 154. The tabs 158 may be formed by bending the stamped sheet metal used to form the feed lines 150. Each arm 152 includes a meandered section 160. The meandered sections 160 may help ensure that the feed lines 150 have a proper input for impedance matching purposes without increasing the length of the feed stalk 110. The rear end of each arm 152 connects to a base section 162 of the respective feed lines 150. Each base section 162 may be a short generally C-shaped piece of metal that joins the two arms 152 of a respective feed line 150. Each feed line 150 may comprise a monolithic piece of metal. Openings 163-1, 163-2 are provided in the base sections 162 of feed lines 150-1, 150-2, respectively. As discussed below, center conductors of respective coaxial feed cables may be inserted through the openings 163-1, 163-2 and soldered in place to pass RF signals between the feed lines 150-1, 150-2 and other elements of a base station antenna.

Still referring to FIGS. 3F and 3G, feed line 150-2 is longer than feed line 150-1. Feed line 150-1 is positioned within the interior of feed line 150-2 and at a right angle to feed line 150-2. As is shown best in FIG. 3E, feed line 150-1 is positioned in channel 140-1 and feed line 150-2 is positioned in channel 140-2.

Figure 4A:
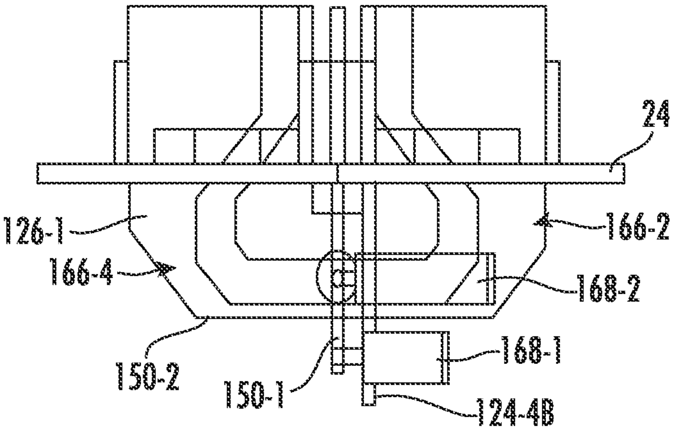
FIGS. 4A and 4B are a side view and a perspective view, respectively, of a rear portion of the feed stalk of the radiating element of FIG. 2.
Figure 4B:
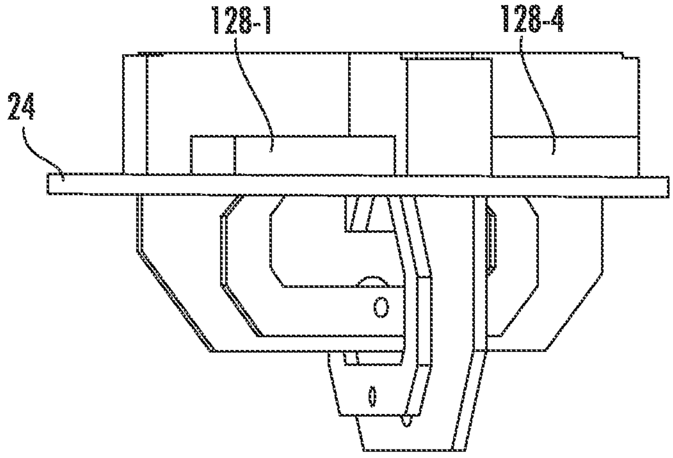

Referring to FIGS. 4A and 4B the plates 128-1 through 128-4 may be used to mount the feed stalk 110 so that it extends forwardly from a reflector 24 of base station antenna 10. As best shown in FIGS. 3A and 3E-3G, the metal sheets 124 and the arms 152 of feed lines 150 may form four stripline segments 164-1 through 164-4 that extend forwardly from the reflector 24 to the front end 114 of the feed stalk 110. As is known to those of skill in the art, a stripline segment refers to a transmission line segment that includes a conductive trace that has a grounded metal sheets on opposed sides thereof, with a dielectric material interposed between the conductive trace and the respective grounded metal sheets. As shown in FIG. 3E, arm 152-1B of feed line 150-1 extends between parallel sheets 124-1B and 124-2A to form a first stripline segment 164-1, arm 152-2B of feed line 150-2 extends between parallel sheets 124-2B and 124-3A to form a second stripline segment 164-2, arm 152-1A of feed line 150-1 extends between parallel sheets 124-3B and 124-4A to form a third stripline segment 164-3, and arm 152-2A of feed line 150-2 extends between parallel sheets 124-4B and 124-1A to form a fourth stripline segment 164-4.

Dielectric rivets and spacers (not shown) are inserted through openings 134 in the metal sheets 124 and through the openings 156 in the feed lines 150 to assemble the feed stalk 110 and to maintain the arms 152 of the feed lines 150-1, 150-2 at the proper distance from the sheets 124 to maintain the proper impedance for the stripline segments 164. Each stripline segment 164 is a so-called "air" stripline as the dielectric material that separates the feed lines from the grounded metal sheets is primarily air.

Referring again to FIGS. 4A-4B, first and second coaxial feed cables 168-1, 168-2 may be used to pass RF signals to and from the radiating element 100. As shown in FIG. 4A, the outer conductor of the first coaxial feed cable 168-1 may be soldered or otherwise electrically connected to the laterally extending connecting section 127 that joins sheet 124-3A to sheet 124-4B. The center conductor of the first coaxial feed cable 168-1 may extend through the opening 129-1 in the laterally extending connecting section 127 and through the opening 163-1 in the base 162 of feed line 150-1. The center conductor of the first coaxial feed cable 168-1 may be soldered to the base 162 of feed line 150-1. The outer conductor of the second coaxial feed cable 168-2 may be soldered or otherwise electrically connected to the extension 126-1 of sheet 124-3B. The center conductor of the second coaxial feed cable 168-2 may extend through the opening 129-2 in the extension 126-1 and through the opening 163-2 in the base 162 of feed line 150-2. The center conductor of the second coaxial feed cable 168-2 may be soldered to the base 162 of feed line 150-2. The second coaxial feed cable 168-2 includes a 900 bend so that it runs parallel to the first coaxial feed cable 168-1. The first and second coaxial feed cables 168-1, 168-2 connect to the feed stalk 110 behind the reflector 24.

As described above, the metal sheets 124 and the forward sections of the feed lines 150 form four stripline segments 164-1 through 164-4. Similarly, the metal sheets 124 and the rearmost sections of the feed lines 150 form first through fourth microstrip segments 166-1 through 166-4 that are connected to the respective first through fourth stripline segments 164-1 through 164-4.

Each microstrip segment 166 includes a conductive trace that is separated from a ground plane by an air dielectric. The conductive trace of the first microstrip segment 166-1 comprises the portion of the base section 162 of feed line 150-1 that extends from opening 163-1 to plate 128-1, and the ground plane of the first microstrip segment 166-1 comprises the extension 126-2 of sheet 124-2A. The conductive trace of the second microstrip segment 166-2 comprises the portion of the base section 162 of feed line 150-2 that extends from opening 163-2 to plate 128-2, and the ground plane of the second microstrip segment 166-2 comprises the extension 126-3 of sheet 124-3A. The conductive trace of the third microstrip segment 166-3 comprises the portion of the base section 162 of feed line 150-1 that extends from opening 163-1 to plate 128-3, and the ground plane of the third microstrip segment 166-3 comprises the extension 126-1 of sheet 124-3B. The conductive trace of the fourth microstrip segment 166-4 comprises the portion of the base section 162 of feed line 150-2 that extends from opening 163-2 to plate 128-4, and the ground plane of the fourth microstrip segment 166-4 comprises the extension 126-4 of sheet 124-4B. The first through fourth microstrip segments 166-1 through 166-4 are positioned behind the reflector 24. By forming the portions of the RF transmission lines that are behind the reflector 24 as microstrip segments, it may be easier to physically and electrically connect the coaxial feed cables 168-1, 168-2 to the feed stalk 110.

The connection of the center conductor of the first coaxial cable 168-1 to feed line 150-1 and the outer conductor of the first coaxial cable 168-1 to sheet 124-3B forms a first power divider 169-1. An RF signal input on the first coaxial cable 168-1 splits as it passes to feed line 150-1 and travels on the two arms 152 thereof. The connection of the center conductor of the second coaxial cable 168-2 to the feed line 150-2 and the outer conductor of the second coaxial cable 168-2 to sheets 124-3A and 124-4B forms a second power divider 169-2. An RF signal input on the second coaxial cable 168-2 splits as it passes to feed line 150-2 and travels on the two arms 152 thereof. Typically, the first and second power dividers 169-1, 169-2 are designed to equally split RF signals input thereto. It will also be appreciated that the first and second power dividers 169-1, 169-2 will operate as power combiners for RF signals received by radiating element 100.

Figure 5A:
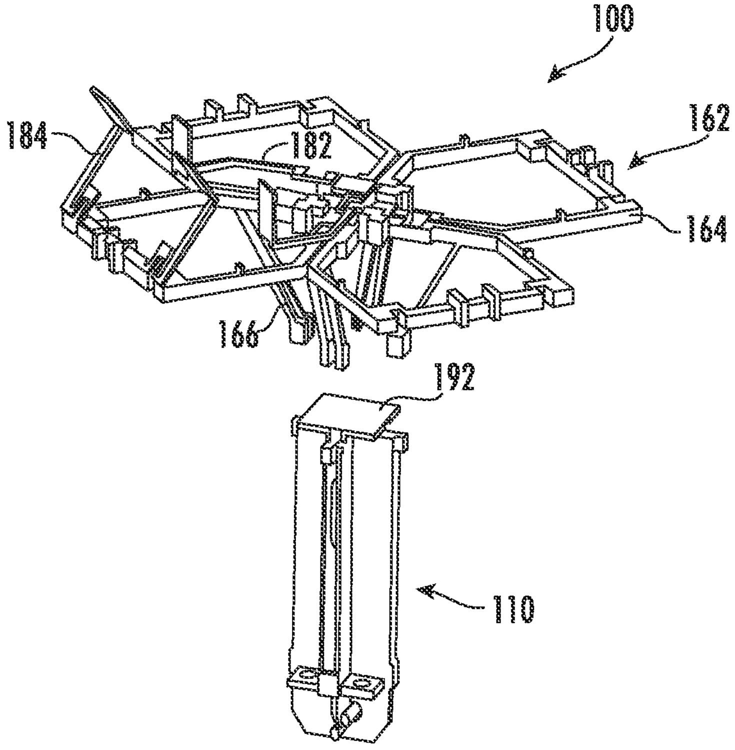
FIG. 5A is a partially exploded perspective view of the radiating element of FIG. 2 with three of the dipole arms removed.
Figure 5B:
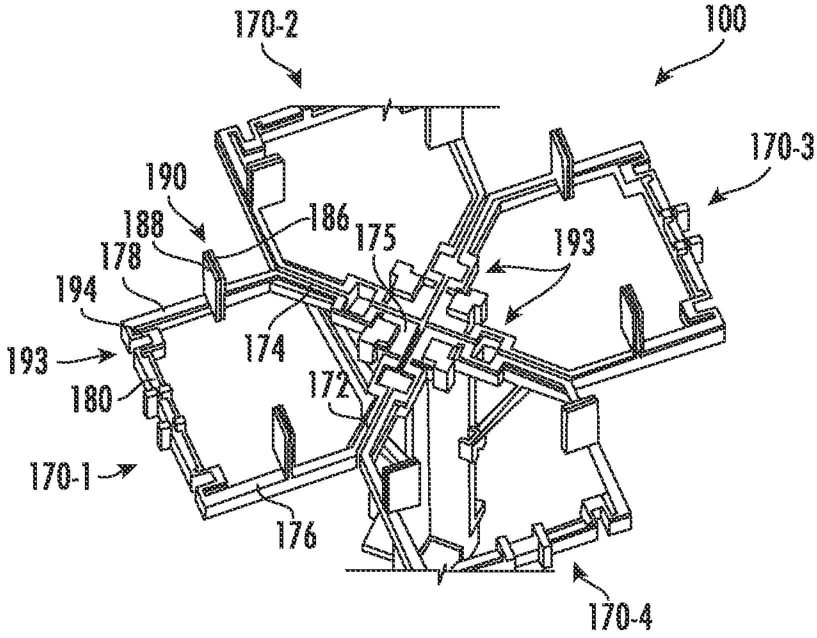
FIG. 5B is a front perspective view of the radiating element of FIG. 2.
Figure 5C:
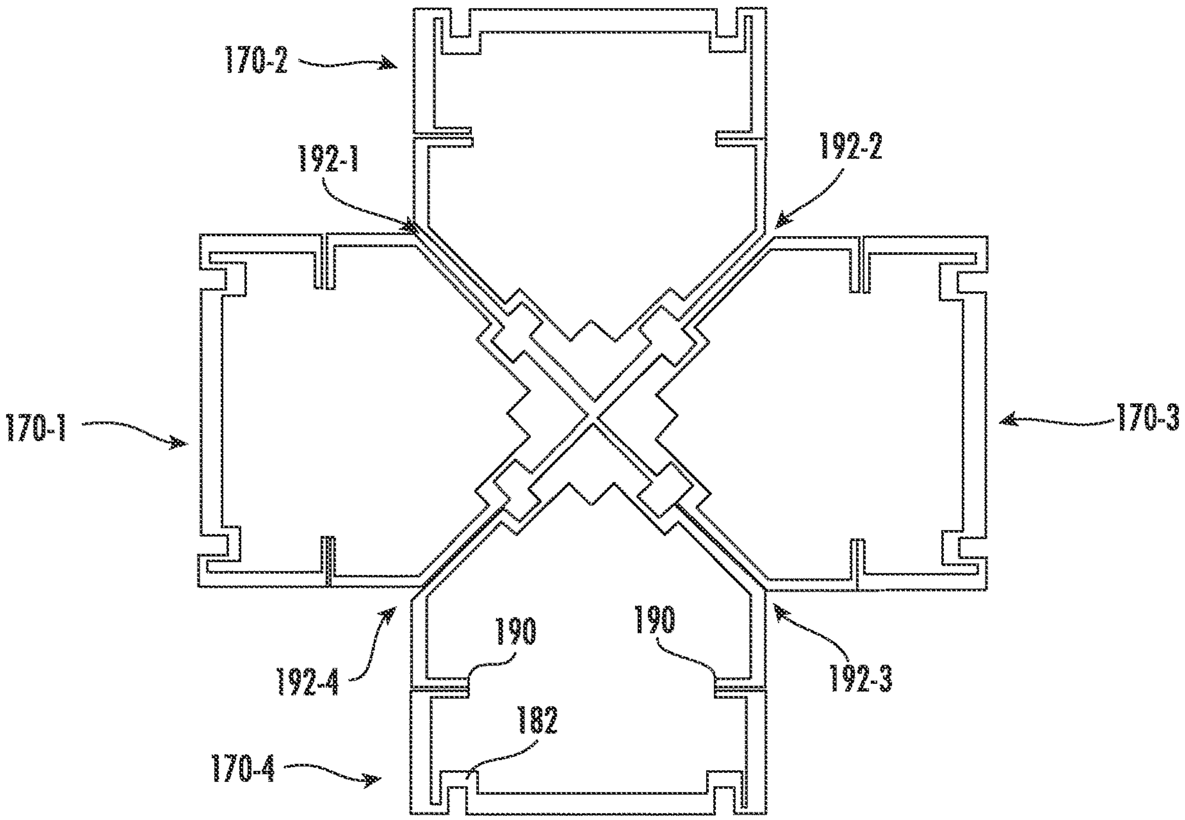
FIG. 5C is a front view of the four dipole arms of the radiating element of FIG. 2.

FIGS. 5A-5C illustrate the radiator unit 160 of radiating element 100 in greater detail. In particular, FIGS. 5A and 5B are a partially exploded perspective view and a front perspective view of the radiating element 100. Only one of the dipole arms is shown in the view of FIG. 5A. FIG. 5C is a front view of the four dipole arms 170-1 through 170-4 of the radiating element 100.

Each dipole arm 170 may have an identical design. As shown in FIGS. 5A-5C, each dipole arm 170 may be shaped generally in the form of an irregular pentagon, although other shapes may be used. In the depicted embodiment, each dipole arm 170 is shaped like a rectangle with an isosceles triangle attached to one side with the overlapping segments of the rectangle and the triangle omitted. Consequently, each dipole arm 170 includes five generally linear segments, namely first and second inner segments 172, 174 and first through third outer segments 176, 178, 180.

Focusing on dipole arm 170-1, the first inner segment 172 extends at an angle of +45° while the second inner segment 174 extends at an angle of −45°. The first and second inner segments 172, 174 each include a widened base and a narrowed distal end. The widened bases of the first and second inner segments 172, 174 together form a rectangular plate 175. The distal end of the first inner segment 172 connects to a proximate end of the first outer segment 176, and the distal end of the second inner segment 174 connects to a proximate end of the second outer segment 178. The third outer segment 180 connects the distal end of the first outer segment 176 to the distal end of the second outer segment 178. The first, second and third outer segments 176 174, 178 connect to each other at right angles to form three sides of the "rectangle" portion of the irregular pentagon shape formed by each dipole arm 170, while the first and second inner segments 172, 174 form the two sides of the isosceles triangle that extends from the rectangle. Together, the four dipole arms 170 define a cruciform shape when viewed from the front.

As shown best in FIG. 5A, each dipole arm 170 may be formed of first and second pieces of stamped sheet metal 182, 184 that are bent into the shape shown in FIGS. 5A and 5B. The first piece of stamped sheet metal 182 may comprise the first and second inner segments 172, 174 and a portion (here, about half) of the first and second outer segments 176, 178. The second piece of stamped sheet metal 184 may comprise the third outer segment 180 and the remainder of the first and second outer segments 176, 178. In an example embodiment, the dipole arms 170 may be formed from sheet metal that is, for example, 0.5-1.2 mm thick (e.g., 0.8 mm thick). The sheet metal may comprise, for example, aluminum or copper.

As shown best in FIG. 5C, slots 192 are formed between adjacent dipole arms 170. In particular, a first slot 192-1 is formed between the second inner segment 174 of dipole arm 170-1 and the first inner segment 172 of dipole arm 170-2, a second slot 192-2 is formed between the second inner segment 174 of dipole arm 170-2 and the first inner segment 172 of dipole arm 170-3, a third slot 192-3 is formed between the second inner segment 174 of dipole arm 170-3 and the first inner segment 172 of dipole arm 170-4, and a fourth slot 192-4 is formed between the second inner segment 174 of dipole arm 170-4 and the first inner segment 172 of dipole arm 170-1.

As shown in FIG. 5B, the two ends of the first piece of stamped sheet metal 182 are widened to form plates 186, and the plates 186 are bent forwardly at an angle of 90θ with respect to the remainder of the first piece of stamped sheet metal 182. Likewise, the two ends of the second piece of stamped sheet metal 184 are widened to form plates 188, and the plates 188 are bent forwardly at an angle of 90° with respect to the remainder of the second piece of stamped sheet metal 184. Each plate 186 is positioned parallel to a corresponding plate 188 and spaced apart therefrom by a small gap so that each pair of plates 186, 188 forms a capacitor 190.

The third outer segment 180 of each dipole arm 170 further includes a pair of meandered trace segments 193, which are each implemented as U-shaped trace segment. The arms 194 of each U-shaped trace segment 193 may be narrower than other portions of the dipole arm 170 so that inductors are formed along the current path on each dipole arm 170. Capacitive coupling may occur between the arms 194, and hence each U-shaped trace segment 193 may form a shunt L-C circuit with the inductance value L determined by the length and width (and thickness) of the narrowed arms 194 and the capacitance value C determined by the gap between the arms 194 and the length and thickness of the arms 194. The shunt L-C circuit formed by each U-shaped trace segment 193 is disposed in series with at least one of the capacitors 190. Additional shunt L-C circuits 193 may be formed in the first inner segments 172 and the second inner segments 174 of each dipole arm 170.

As explained in an article entitled *Suppression of Cross-Band Scattering in Multiband Antenna Arrays* by Hai-Han Sun, Can Ding, He Zhu and Bevan Jones, IEEE Transactions on Antennas and Propagation, Vol. 67, No. 4, April 2019, at 2379-2389, the above described arrangement of a shunt L-C circuit in series with a capacitor can be used to form a band stop filter along the dipole arm 170. The band stop filter may be tuned to allow RF signals in the operating frequency range of radiating element 100 to pass along the dipole arms 170, while blocking RF signals in other frequency bands, specifically including frequencies within the operating frequency range of radiating elements that operate in other frequency bands that are positioned nearby radiating element 100.

Figure 5D:
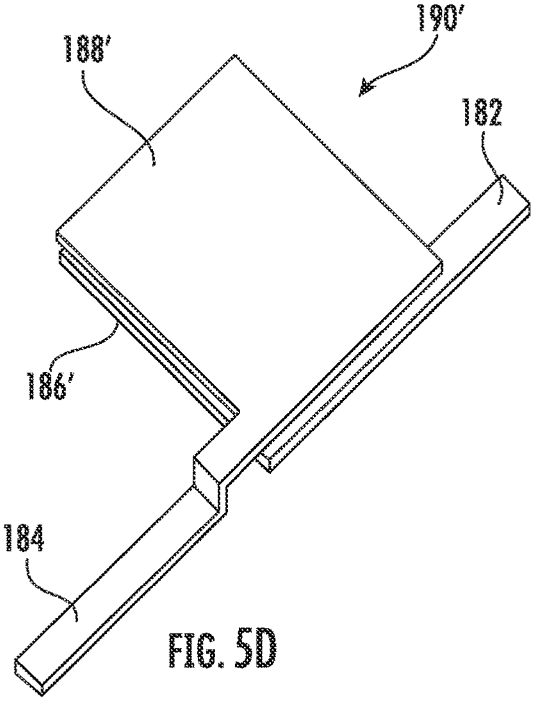
FIG. 5D is a schematic perspective view of an alternative implementation of one of the series capacitors implemented in the dipole arms of the radiating element of FIG. 2.

While FIGS. 5A-5C illustrate the plates 186, 188 that form the capacitors 190 as extending forwardly from radiating element 100, embodiments of the present invention are not limited thereto. For example, as shown in FIG. 5D, in another embodiment plates 186' may be formed at the distal ends of the first piece of stamped sheet metal 182 and plates 188' may be formed at the distal ends of the second piece of stamped sheet metal 184. One of the first or second pieces of stamped sheet metal 182, 184 may include a pair of 90θ bends that allow the two plates 186', 188' to be arranged in parallel and spaced-apart arrangement to each other, with each plate 186', 188' extending parallel to a plane defined by the remainder of the dipole arm 170 to form a capacitor 190'. The design shown in FIG. 5D may be advantageous because it may reduce the extent to which the radiating element 100 extends forwardly from the reflector.

The radiating element 100 may include capacitive connections between the feed stalk 110 and the dipole arms 170. This may be advantageous as it may avoid the need for soldered connections, which may be labor intensive and which can increase manufacturing time and cost, and because the capacitive connections may avoid the passive intermodulation distortion issue that can arise with poor quality soldered connections (or soldered connections that are later subjected to stress). The ground connections between the feed stalk 110 and the dipole arms 170 may be achieved by capacitive connections that are formed between the plates 132 at the forward ends of the sheets 124 of feed stalk 110 (each of which are at ground potential) and the rectangular plates 175 that are provided at the base of each dipole arm 170. A dielectric pad 194 may be interposed between the plates 132 and the plates 175 to act as the dielectric for these capacitive connections.

Capacitive connections may also be provided between the feed lines 150-1, 150-2 and the dipole arms 170. In particular, the tabs 158 on each feed line 150 extend from the middle of a respective one of the channels 140-1, 140-2 to one side of the channel 140, as is best shown in FIGS. 3A-3B. The dielectric pad 194 covers each tab 158 and separates it from the respective dipole arms 170. When an RF signal is applied to the feed lines 150, the tabs 158 generate a voltage differential across each slot 192 between adjacent dipole arms 170, thereby exciting the dipole arms 170 to radiate.

As shown in FIG. 5A, the dielectric support 162 may comprise a unitary plastic support that includes four dipole arm supports 164 and a plurality of buttresses 166 that provide additional support to the dipole arm supports 164. The dielectric support 162 may be mounted on the feed stalk 110. The dielectric support 162 may be formed, for example, via injection molding.

Figure 6A:
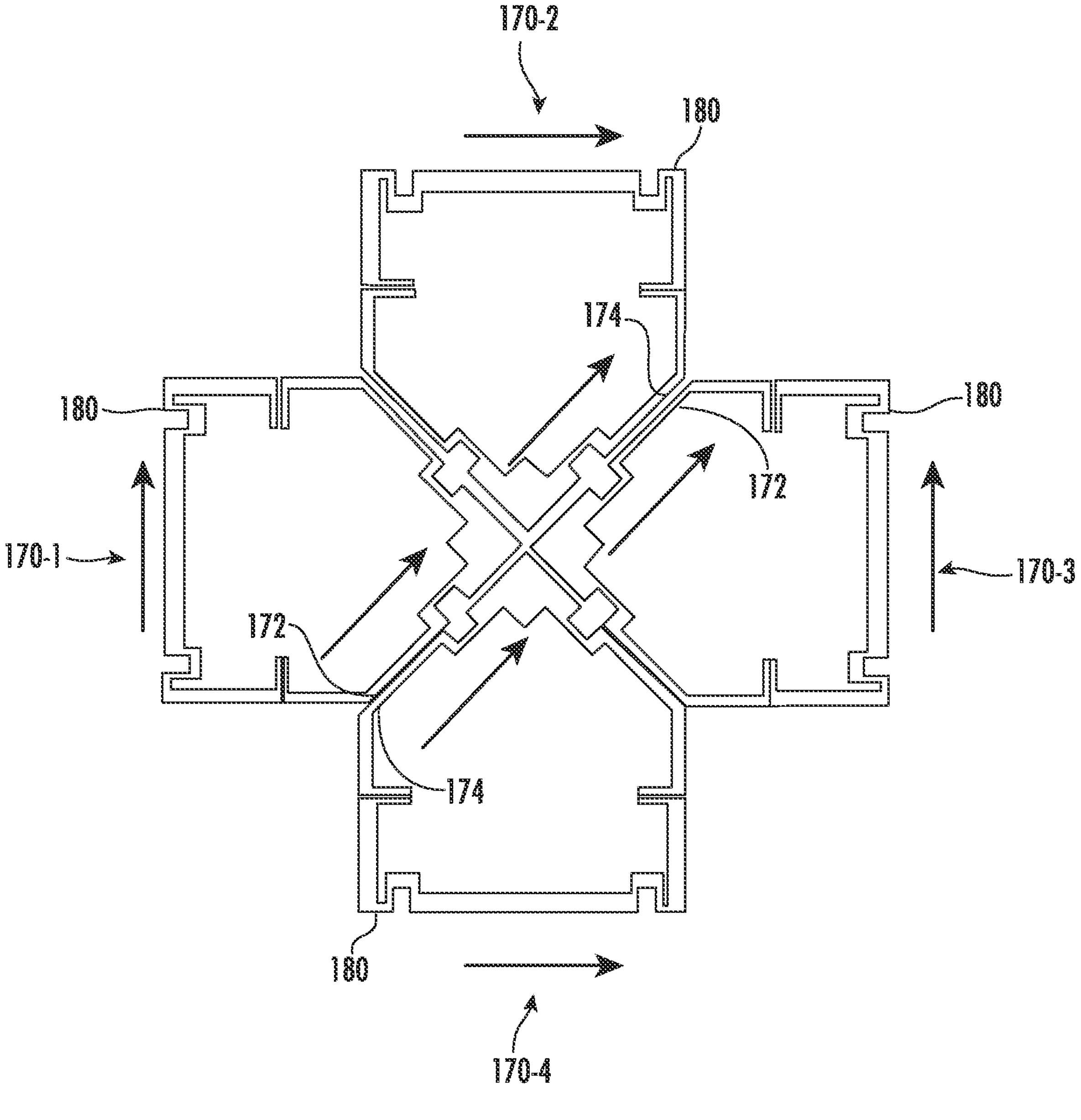
FIGS. 6A and 6B are front views of the radiating element of FIG. 2 that illustrates the direction of current flow on each dipole arm when the radiating element is excited to radiate RF energy having a +45° polarization and a −45° polarization, respectively.

FIG. 6A is a schematic front view of the dipole arms 170 of radiating element 100 that illustrates the direction of current flow on the dipole arms 170 in response to an RF signal being input to radiating element 100 from coaxial feed cable 168-1. As shown in FIG. 6A, when radiating element 100 is excited by an RF signal provided by coaxial feed cable 168-1, currents flow upwardly on the third outer segment 180 of dipole arm 170-1, and flow to the right on the third outer segment 180 of dipole arm 170-2. The third outer segments 180 of dipoles arms 170-1 and 170-2 together act as a first radiating structure, and applying superposition principles it can be seen that the currents flowing on these two outer segments 180 together emit radiation having a +45° polarization. Additionally, when radiating element 100 is excited by the RF signal provided by coaxial feed cable 168-1, currents flow to upwardly on the third outer segment 180 of dipole arm 170-3, and flow to the right on the third outer segment 180 of dipole arm 170-4. The third outer segments 180 of dipoles arms 170-3 and 170-4 together act as a second radiating structure, and applying superposition principles it can be seen that the currents flowing on these two outer segments 180 together also emit radiation having a +45° polarization. As is further shown in FIG. 6A, currents flow from the bottom/left to the top/right on both the first internal segments 172 of dipole arms 170-1 and 170-3 and on the second internal segments 174 of dipole arms 170-2 and 170-4. These internal segments 172, 174 form a third radiating structure that also emits radiation having a +45° polarization.

Figure 6B:
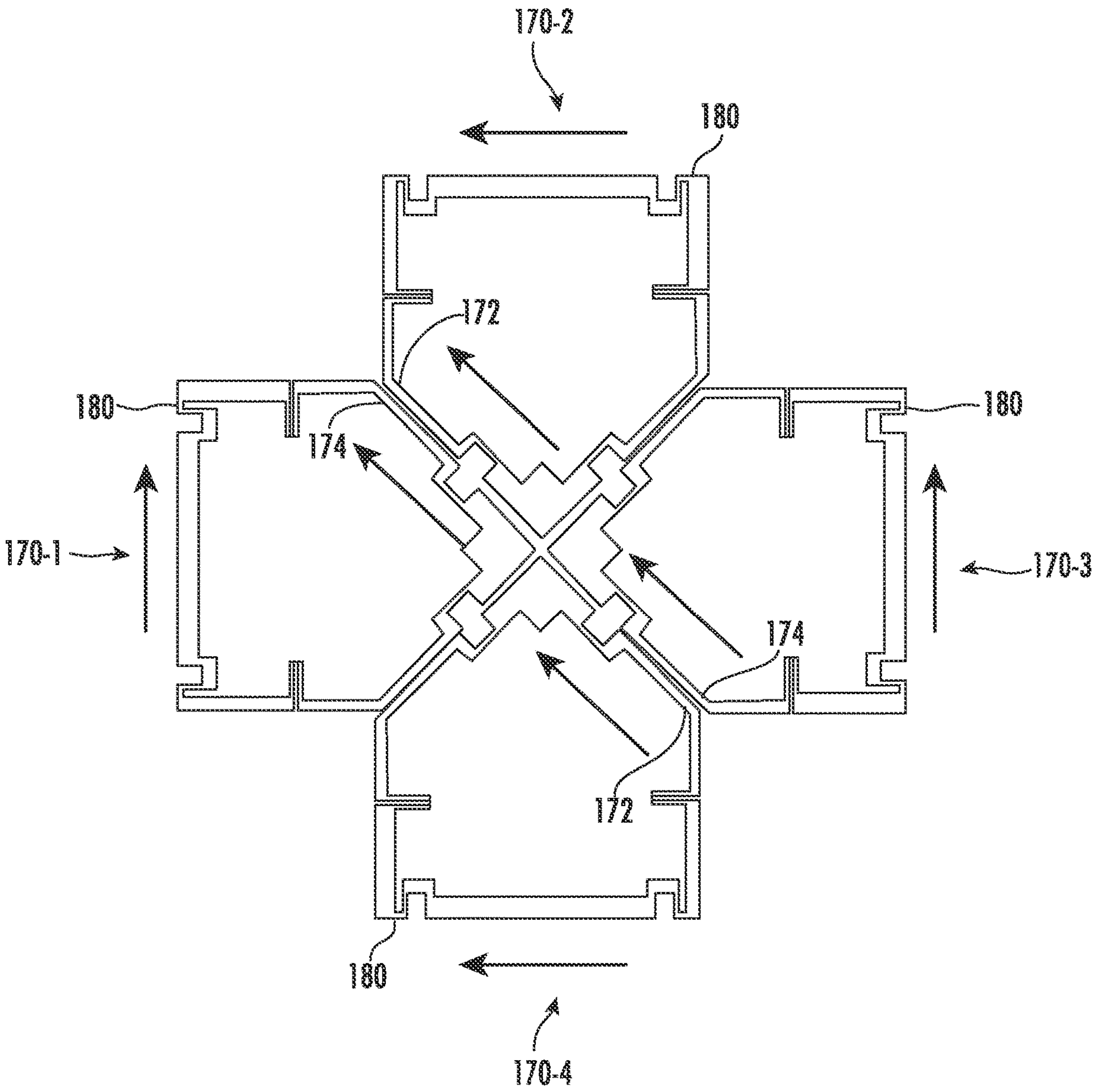

FIG. 6B is a schematic front view of the dipole arms 170 of radiating element 100 that illustrates the direction of current flow on the dipole arms 170 in response to an RF signal being input to radiating element 100 from coaxial feed cable 168-2. As shown in FIG. 6B, when radiating element 100 is excited by an RF signal provided by coaxial feed cable 168-2, currents flow upwardly on the third outer segment 180 of dipole arm 170-1, and flow to the left on the third outer segment 180 of dipole arm 170-2. The third outer segments 180 of dipoles arms 170-1 and 170-2 together act as a first radiating structure, and applying superposition principles it can be seen that the currents flowing on these two outer segments 180 together emit radiation having a −45° polarization. Additionally, when radiating element 100 is excited by the RF signal provided by coaxial feed cable 168-1, currents flow to upwardly on the third outer segment 180 of dipole arm 170-3, and flow to the left on the third outer segment 180 of dipole arm 170-4. The third outer segments 180 of dipoles arms 170-3 and 170-4 together act as a second radiating structure, and applying superposition principles it can be seen that the currents flowing on these two outer segments 180 together also emit radiation having a −45° polarization. As is further shown in FIG. 6B, currents flow from the bottom/right to the top/left on both the first internal segments 172 of dipole arms 170-2 and 170-4 and on the second internal segments 174 of dipole arms 170-1 and 170-3. These internal segments 172, 174 form a third radiating structure that also emits radiation having a −45° polarization. Since the radiating element 100 has three separate radiating structures for each polarization, it may exhibit higher directivity as compared to conventional radiating elements.

Figure 7A:
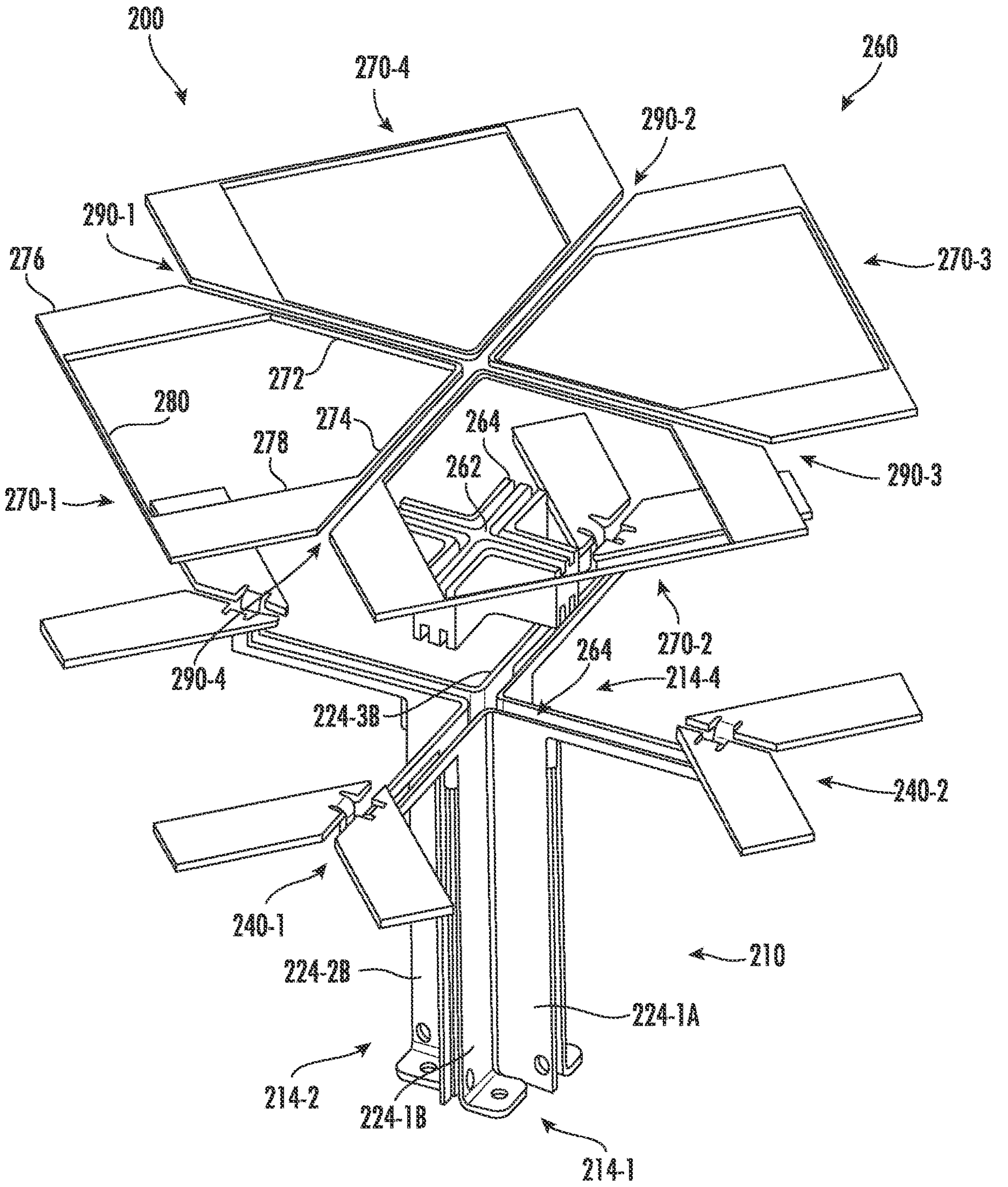
FIG. 7A is a schematic exploded perspective view of a radiating element according to further embodiments of the present invention.
Figure 7B:
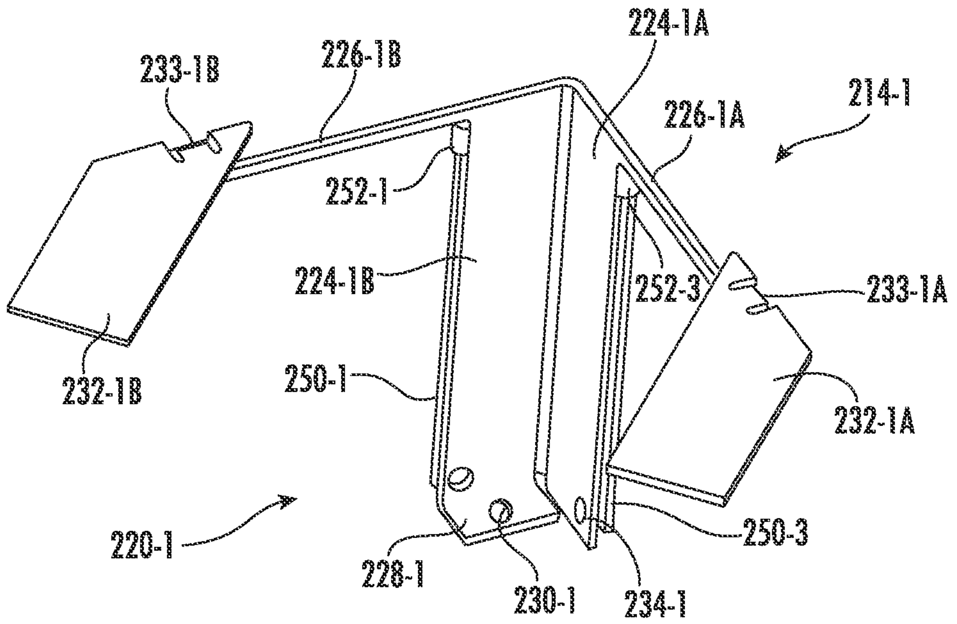
FIG. 7B is a perspective view of one of the four feed stalk members of the radiating element of FIG. 7A.
Figure 7C:
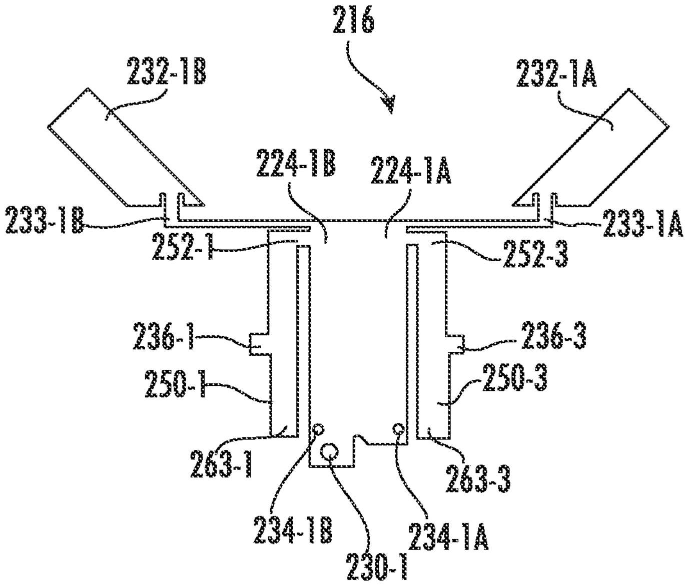
FIG. 7C is a front view of a stamped piece of sheet metal that may be bent to form one of the two feed stalk member configurations used in the radiating element of FIG. 7A.
Figure 7D:
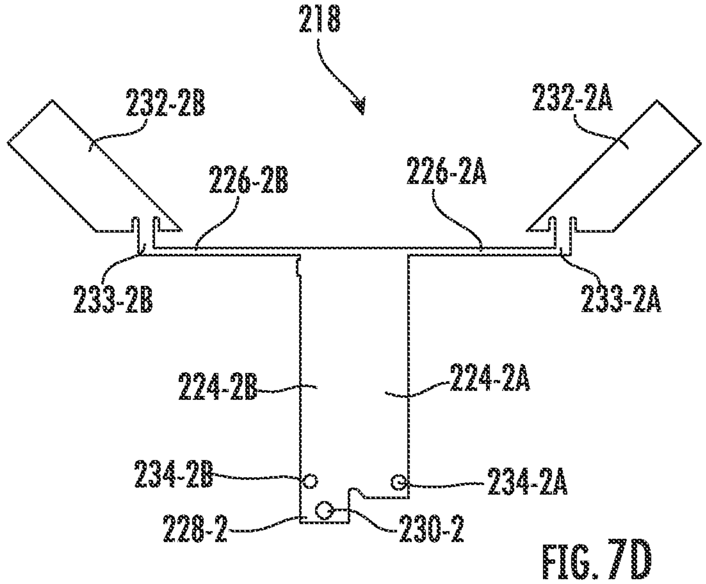
FIG. 7D is a front view of another stamped piece of sheet metal that may be bent to form the other of the two feed stalk member configurations used in the radiating element of FIG. 7A.
Figure 7E:
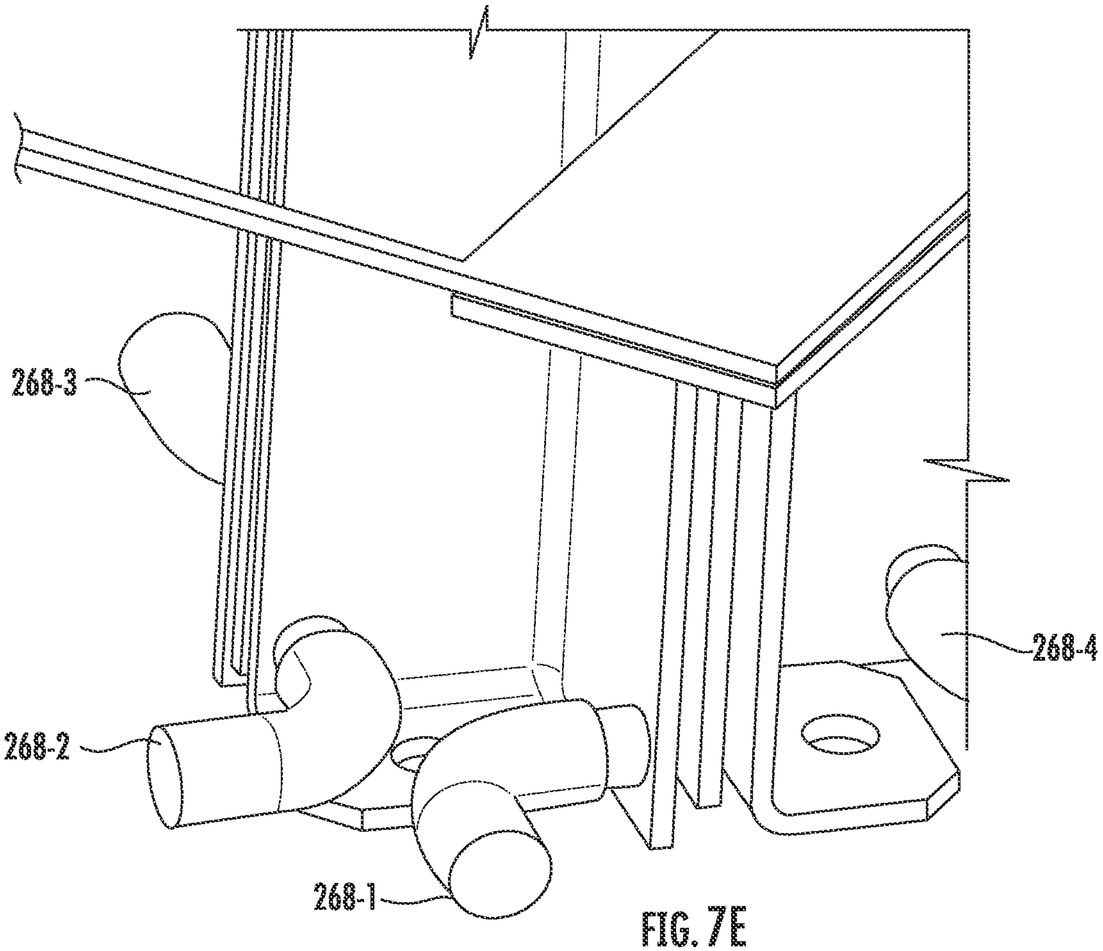
FIG. 7E is an enlarged schematic view of the rear portion of the feed stalk of the radiating element of FIG. 7A illustrating how coaxial feed cables may be coupled thereto.
Figure 7F:
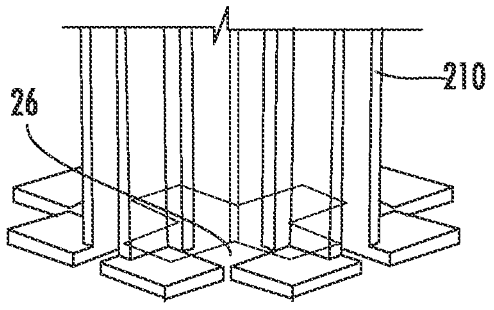
FIG. 7F is a partial perspective view illustrating how a cruciform opening may be formed in the reflector to facilitate reworking solder joints after the radiating element of FIG. 7A has been installed on a base station antenna.

FIGS. 7A-7F illustrate a dual-polarized radiating element 200 according to further embodiments of the present invention. In particular, FIG. 7A is a schematic exploded perspective view of the radiating element 200. FIG. 7B is a perspective view of one of the four feed stalk members of the radiating element 200, and FIGS. 7C and 7D are front views of stamped pieces of sheet metal that may be bent to form the two respective feed stalk member configurations used in the radiating element 200. FIG. 7E is an enlarged schematic view of the rear portion of the feed stalk of radiating element 200 illustrating how coaxial feed cables may be coupled thereto. Finally, FIG. 7F is a partial perspective view illustrating how a cruciform opening may be formed in the reflector of a base station antenna that includes the radiating element 200 in order to facilitate reworking solder joints after the radiating element 200 has been installed on the reflector. The dual-polarized radiating element 200 may be used, for example, in place of the dual-polarized low-band radiating elements 32 shown in FIG. 1B.

As shown in FIG. 7A, the dual-polarized radiating element 200 includes a feed stalk 210 and a radiator unit 260. The feed stalk includes a base which may be mounted to extend forwardly from the reflector 24 of base station antenna 100, and a distal end which is positioned forwardly of the base. The radiator unit 260 is mounted on the distal (forward) end of the feed stalk 210. The feed stalk 210 may be mounted so that a longitudinal axis thereof is perpendicular to the reflector 24.

The radiator unit 260 includes first through fourth dipole arms 270-1 through 270-4 and a dielectric spacer 262. Each dipole arm 270 may be formed of stamped sheet metal in some embodiments, although other implementations are possible (e.g., forming the dipole arms 270 on one or more printed circuit boards). The dipole arms 270 are arranged to define a cruciform shape when the radiating element 200 is viewed from the front (which, in the orientation of FIG. 7A, corresponds to being viewed from above).

FIGS. 7A-7C show the design of the feed stalk 210. The feed stalk 210 includes a total of four metal pieces 214-1 through 214-4 that form four stalk members 220-1 through 220-4 and four feed lines 250-1 through 250-4. In the depicted embodiment, the four metal pieces 214 may be formed by stamping and bending a piece of sheet metal. FIG. 7C illustrates a first stamped piece of sheet metal 216 that may be used to form the first metal piece 214-1 (and an identical stamped piece of sheet metal 216 may be used to form the third metal piece 214-3). FIG. 7D illustrates a second stamped piece of sheet metal 218 that may be used to form the second a metal piece 214-2 (and an identical stamped piece of sheet metal 218 may be used to form the fourth metal piece 214-4). It will be appreciated, however, that more or fewer stalk members 220 and/or feed lines 250 may be included in other embodiments.

Referring to FIGS. 7B and 7C, the first stamped piece of sheet metal 216 may be used to form the first stalk member 220-1 and the first and third feed lines 250-1, 250-3. The first stalk member 220-1 comprises a first pair of forwardly extending metal sheets 224-1A, 224-1B that are arranged perpendicular to each other. Sheets 224-1A and 224-1B are physically connected to each other, but it will be appreciated that two separate sheets could be used in other embodiments (see FIG. 8 and discussion thereof below). A rear plate 228-1 having an opening 230-1 extends at a right angle from the rear portion of sheet 224-1B. The plate 228-1 may be used to mount the first stalk member 220-1 to the reflector 24 of base station antenna 100 using a bolt or rivet (not shown). While the rear plate 228-1 is connected to sheet 224-1B in the depicted embodiment, it will be appreciated that it could alternatively or additionally be connected to sheet 224-1A in other embodiments. An opening 234-1A is provided near the rear end of sheet 224-1A, and an opening 234-1B is provided near the rear end of sheet 224-1B. The openings 234-1A, 234-1B may receive a coaxial cable (or a portion thereof) that connects to one of the feed lines 250, as will be explained below. A first thin arm 226-1A extends perpendicularly from the forward (distal) end of sheet 224-1A, and a second thin arm 226-1B extends perpendicularly from the forward (distal) end of sheet 224-1B. The first and second arms 226-1A, 226-1B may extend perpendicularly to each other, as shown in FIG. 7B. A forward plate 232-1A extends from a distal end of the first arm 226-1A, and a forward plate 232-1B extends from a distal end of the second arm 226-1B. The plates 232-1A, 232-1B may define angles of 45° with respect to the arms 226-1A, 226-1B from which they extend.

Small tabs 233-1A, 233-1B may connect the plates 232-1A, 232-1B to the respective arms 226-1A, 226-1B. Each plate 232-1A, 232-1B may be bent 90° with respect to the arm 226-1A, 226-1B from which it extends. The plates 232-1A, 232-1B may capacitively couple with corresponding plates on a first of the dipole arms 270-1, as will be discussed in greater detail below.

The first feed line 250-1 is connected to the forward portion of metal sheet 224-1B by a tab 252-1. The first feed line 250-1 comprises a rectangular strip of metal that extends forwardly from a position that is slightly forward of the front surface of the reflector 24. Starting with the first stamped piece of sheet metal 216 shown in FIG. 7C, the first feed line 250-1 is bent through an angle of 180° to extend parallel to metal sheet 224-1B. The rear portion of the first feed line 250-1 includes an opening 263-1 that receives a center conductor of a first coaxial feed cable. A tab 236-1 extends outwardly from a central portion of the first feed line 250-1. The tab 236-1 is part of the impedance matching circuit of the radiating element 200.

The third feed line 250-3 may be essentially identical to the first feed line 250-1. The third feed line 250-3 is connected to the forward portion of metal sheet 224-1A by a tab 252-3. The third feed line 250-3 comprises a rectangular strip of metal that extends forwardly from a position that is slightly forward of the front surface of the reflector 24, and extends parallel to metal sheet 224-1A. The rear portion of the third feed line 250-3 includes an opening 263-3 that receives a center conductor of a third coaxial feed cable. A tab 236-3 extends outwardly from a central portion of the third feed line 250-3.

Another piece of metal that is shaped identically to the first stamped piece of sheet metal 216 shown in FIG. 7C may be used to form the third stalk member 220-3 and the second and fourth feed lines 250-2, 250-4. As the third stalk member 220-3 and the second and fourth feed lines 250-2, 250-4 may be identical to the above discussed first stalk member 220-1 and the first and third feed lines 250-1, 250-3, further description thereof will be omitted.

Referring to FIGS. 7A and 7D, the second stamped piece of sheet metal 218 may be used to form the second stalk member 220-2. The second stalk member 220-2 includes a second pair of forwardly extending metal sheets 224-2A, 224-2B that are arranged perpendicular to each other. Sheets 224-2A and 224-2B are physically connected to each other, but it will be appreciated that two separate sheets could be used in other embodiments). A rear plate 228-2 having an opening 230-2 extends at a right angle from the rear portion of sheet 224-2B. The rear plate 228-2 may be used to mount the second stalk member 220-2 to the reflector 24. While the rear plate 228-2 is connected to sheet 224-2B in the depicted embodiment, it will be appreciated that it could alternatively or additionally be connected to sheet 224-1A in other embodiments. An opening 234-2A is provided near the rear end of sheet 224-2A, and an opening 234-2B is provided near the rear end of sheet 224-2B. The openings 234-2A, 234-2B may receive a coaxial cable (or a portion thereof) that connects to one of the feed lines 250, as will be explained below. A first thin arm 226-2A extends perpendicularly from the forward (distal) end of sheet 224-2A, and a second thin arm 226-2B extends perpendicularly from the forward (distal) end of sheet 224-2B. The first and second arms 226-2A, 226-2B may extend perpendicularly to each other. A forward plate 232-2A extends from a distal end of the first arm 226-2A, and a forward plate 232-2B extends from a distal end of the second arm 226-2B. The plates 232-2A, 232-2B may define angles of 45° with respect to the arms 226-2A, 226-2B from which they extend. Small tabs 233-2A, 233-2B may connect the plates 232-2A, 232-2B to the respective arms 226-2A, 226-2B. Each plate 232-2A, 232-2B may be bent 90° with respect to the arm 226-2A, 226-2B from which it extends. The plates 232-2A, 232-2B may capacitively couple with corresponding plates on a first of the dipole arms 270-2.

Another piece of metal that is shaped identically to the stamped piece of sheet metal 218 shown in FIG. 7D may be used to form the fourth stalk member 220-4. As the fourth stalk member 220-4 may be identical to the above discussed second stalk member 220-2, further description thereof will be omitted.

As shown in FIG. 7A, each of the four feed stalk members 220-1 through 220-4 is positioned in a respective one of the four quadrants of a square when the feed stalk 210 is viewed from the front. Each feed stalk members 220 faces two other feed stalk members 220 and is positioned diagonally with respect to the remaining feed stalk member 220. The feed stalk members 220 are spaced apart from one another, with each feed stalk member 220 being positioned parallel to a sheet 224 of a facing feed stalk member 220.

First and second channels 240-1, 240-2 bisect the feed stalk 210. Channel 240-1 is perpendicular to channel 240-2. The first channel 240-1 is defined by parallel sheets 224-1B and 224-2A and 224-3B and 224-4A, and the second channel 240-2 is defined by parallel sheets 224-1A and 224-4B and 224-2B and 224-3A. The channels 240-1, 240-2 extend the full length of the feed stalk 210.

The metal sheets 224 and the feed lines 250 may form four forwardly extending stripline transmission lines 264. Feed line 250-1 extends between parallel sheets 224-1B and 224-2A to form the first stripline transmission line 264, feed line 250-2 extends between parallel sheets 224-2B and 224-3A to form a second stripline transmission line 264, feed line 250-3 extends between parallel sheets 224-3B and 224-4A to form a third stripline transmission line 264, and feed line 250-4 extends between parallel sheets 224-4B and 224-1A to form a fourth stripline transmission line 264. Dielectric rivets or spacers (not shown) may be used to maintain the feed lines 250 at the proper distance from the metal sheets 224 to maintain the proper impedance for the stripline transmission lines 264.

Referring to FIG. 7E, first through fourth coaxial feed cables 268-1 through 268-2 may be used to pass RF signals to and from the radiating element 200. The outer conductor of the each coaxial feed cable 268 may be soldered or otherwise electrically connected a respective one of the metal sheets 224 adjacent the respective openings 234 in the sheets 224. The center conductor of each coaxial feed cable 268 may extend through an opening 234 in a sheet 224 and through the opening 263 in a feed stalk 250. The center conductor of each coaxial feed cable 268 may be soldered to a respective one of the feed lines 250 around the opening 263. The coaxial feed cables 268 may extend through one or more openings in the reflector 24 to connect to the feed stalk 210.

Referring again to FIG. 7A, the radiator unit 260 includes four dipole arms 270-1 through 270-4. Each dipole arm 270 may have an identical design, and may be shaped generally in the form of an irregular pentagon. Each dipole arm 270 includes five generally linear segments, namely first and second inner segments 272, 274 and first through third outer segments 276, 278, 280.

In the depicted embodiment, each dipole arm 270 is a planar dipole arm (e.g., a stamped sheet metal dipole arm), although embodiments of the present invention are not limited thereto. For example, in other embodiments, the dipole arms may have downward and/or upward extensions that may allow maintaining a desired physical length for each dipole arm while increasing the distance between dipole arms of adjacent radiating elements. In the depicted embodiment, each dipole arm 270 includes a first inner segment 272 that extends at an angle of +45° and a second inner segment 274 extends at an angle of −45°. The first and second inner segments 272, 274 are each narrow segments that have widened distal ends. The first outer segment 276 and the second outer segment 278 are each formed as plates (e.g., rectangular plates) that connect to the distal ends of the first inner segment 272 and the second inner segment 274, respectively. The third outer segment 280 connects the distal end of the first outer segment 276 to the distal end of the second outer segment 278, and is formed as a narrow metal segment. The first, second and third outer segments 274, 276, 278 connect to each other at right angles to form three sides of the "rectangle" portion of the irregular pentagon shape formed by each dipole arm 270, while the first and second inner segments 272, 274 form the two sides of the isosceles triangle that extends from the rectangle. Together, the four dipole arms 270 define a cruciform shape when viewed from the front.

The dipole arms 270 are arranged so that slots 290 are formed between adjacent dipole arms 270. In particular, a first slot 290-1 is formed between the second inner segment 274 of dipole arm 270-1 and the first inner segment 272 of dipole arm 270-2, a second slot 290-2 is formed between the second inner segment 274 of dipole arm 270-2 and the first inner segment 272 of dipole arm 270-3, a third slot 290-3 is formed between the second inner segment 274 of dipole arm 270-3 and the first inner segment 272 of dipole arm 270-4, and a fourth slot 290-4 is formed between the second inner segment 274 of dipole arm 270-4 and the first inner segment 272 of dipole arm 270-1.

The radiating element 200 may include capacitive connections between the feed stalk 210 and the dipole arms 270. The transfer of energy between the feed stalk 210 and the dipole arms 270 may be achieved by capacitive connections that are formed between the plates 232 of feed stalk 210 (each of which is at ground potential) and the plate-like first and second outer segments 274, 276 of each dipole arm 270. A dielectric pad (not shown) may be interposed between the plates 232 and the first and second outer segments 274, 276 of each dipole arm 270. The forward end of each feed stalk 250 is located within a respective one of the slots 290. When an RF signal is applied to one of the feed lines 250, the RF energy radiated from the forward end of the feed line 250 generates a voltage differential across its corresponding slot 290, thereby exciting the dipole arms 270 on either side of the slot 290 to radiate.

As shown in FIG. 7A, the dielectric spacer 262 may comprise a unitary plastic support that maintains the spacing between adjacent stalk members 220 at a desired distance. The spacer 262 further includes grooves 264 that receive the inner segments 272, 274 of the dipole arms 270. While not shown, additional features may be provided on the spacer 262 that allow the dipole arms 270 to snap in place within the spacer 262.

The radiating element 200 is similar to the radiating element 100 discussed above, except that the capacitive connections between the dipole arms 170 and grounded metal sheets 124 are positioned in the center of radiating element 100, whereas these connections are at outer portions of the dipole arms 270 in radiating element 270. The current flow on the dipole arms 270 is the same as shown with respect to radiating element 100 with reference to FIGS. 6A and 6B, and hence further description thereof will be omitted here.

FIG. 7F is an enlarged perspective view of a bottom portion of the feed stalk 210 when the radiating element 200 is mounted on a reflector 24 of a base station antenna. As shown, an opening 26 may be formed in the reflector 24. The opening 26 may facilitate forming and/or reworking soldered connections between the coaxial feed cables 268 and the sheets 224 and feed lines 250. In the depicted embodiment, the opening 26 has a cruciform shape, although other shapes may be used.

Figure 8:
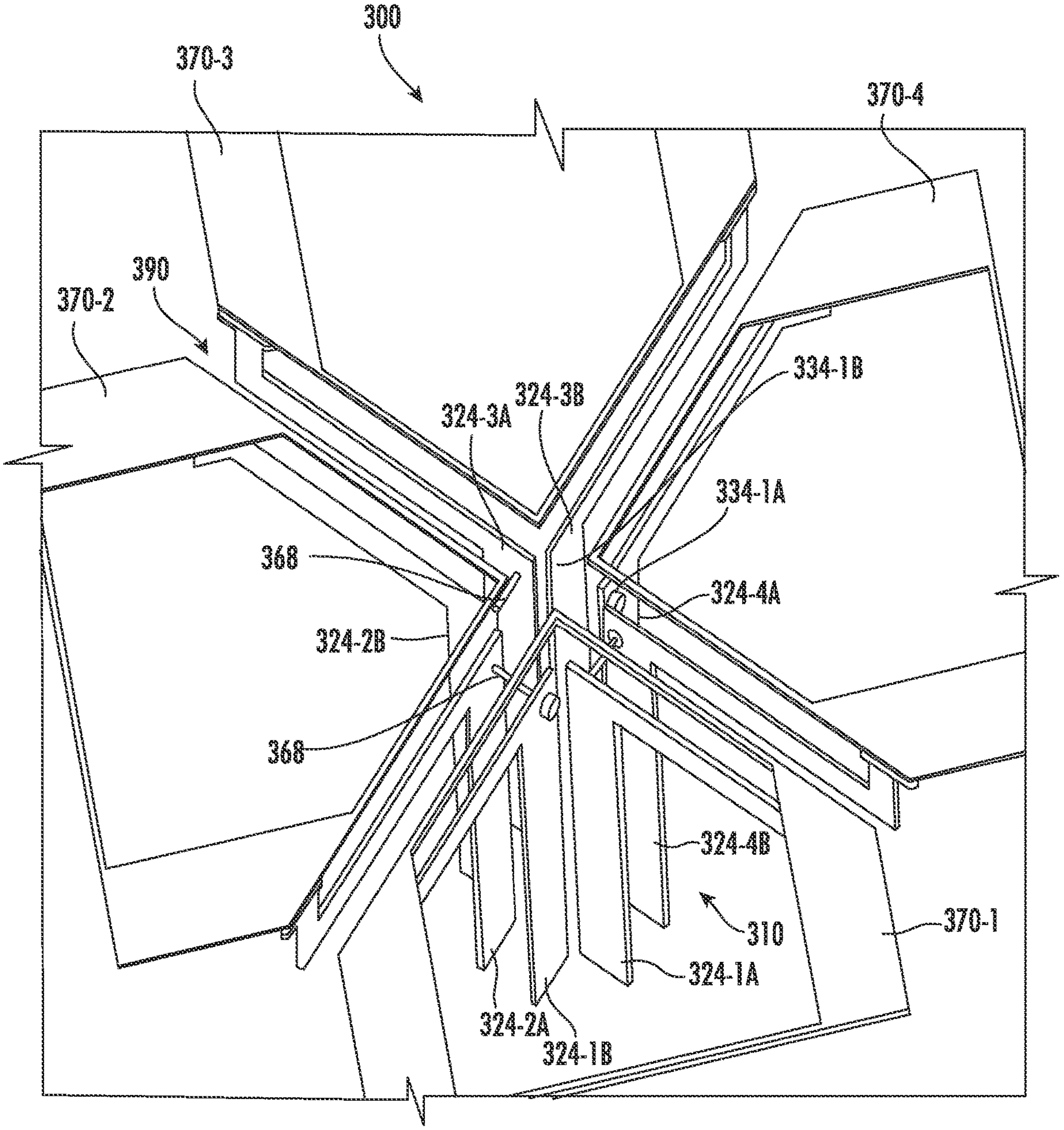
FIG. 8 is a schematic perspective view of a modified version of the radiating element of FIG. 7A that includes direct feeds and "split" feed stalks.

FIG. 8 is a schematic partial perspective view of a radiating element 300 that is a modified version of the radiating element 200 of FIG. 7A. The radiating element 300 differs from the radiating element 200 primarily in that (1) the radiating element 300 includes a "direct" as opposed to a capacitive feed and (2) the radiating element 300 includes "split" feed stalks.

As can be seen by comparing FIGS. 7A and 8, the four stalk members 220-1 through 220-4 (that each comprise an integral pair of forwardly extending metal sheets 224*A, 224*B) and four feed lines 250-1 through 250-4 are replaced in radiating element 300 with four non-integral pairs of forwardly extending metal sheets 324-*A, 324*B (the "*" is a wildcard character that represents an integer having a value of 1, 2, 3 or 4). In other words, the feed stalk 310 of radiating element 300 (1) omits the four feed lines 250-1 through 250-4 of radiating element 200 and (2) uses separate pieces to implement the two metal sheets 324-*A, 324-*B of each stalk member 320 instead of using a single bent piece of metal as in radiating element 200. Because the feed lines 250 are omitted in radiating element 300, each coaxial feed cable 368 (only the center conductors of the coaxial feed cables 368 are shown in FIG. 8) connects to a forward portion of a first metal sheet 324-*A of a respective one of the pairs. In particular, the outer conductor of the coaxial feed cable 368 may be soldered to the first metal sheet 324-*A of the pair, and the center conductor of the coaxial feed cable 368 extends through the first metal sheet 324-*A of the pair and is electrically connected (e.g., soldered) to the second metal sheet 324-*B of an adjacent pair, as shown in FIG. 8. Thus, in the embodiment of FIG. 8, the center conductor of each coaxial feed cable 368 transmits the RF signal directly across a respective one of the slots 390, thereby generating the voltage differential across the slot 390 to excite the dipole arms 370.

Each coaxial feed cable 368 may extend forwardly from the reflector 24 and may be attached by clips or other fasteners to one of the metal sheets 324 of a pair. The end portion of each coaxial feed cable 368 may be bent 90° and the end of the cable jacket, the outer conductor and the dielectric spacer of each coaxial feed cable 368 may be removed in a fashion well known in the art so that the outer conductor of each coaxial feed cable 368 may be soldered to the other metal sheet 324 of the pair and so that the center conductor of the coaxial feed cable 368 may extend through the opening 334-1A and into the opening 334-1B in a metal sheet 324 of an adjacent pair.

It will also be appreciated that the radiating elements according to embodiments of the present invention may have a wide variety of dipole arm designs. FIGS. 9A-9D are front views of the dipole arms of radiating elements according to four additional embodiments of the present invention. It will be appreciated that the feed stalk designs for these radiating elements may be similar to the feed stalk 210 of radiating element 200 or to the feed stalk 310 of radiating element 300, with the primary difference being that the inner and outer segments of each dipole arm may be modified to conform to the shape of the dipole arm and to capacitively couple with one or more widened sections of the dipole arm.

Figure 9A:
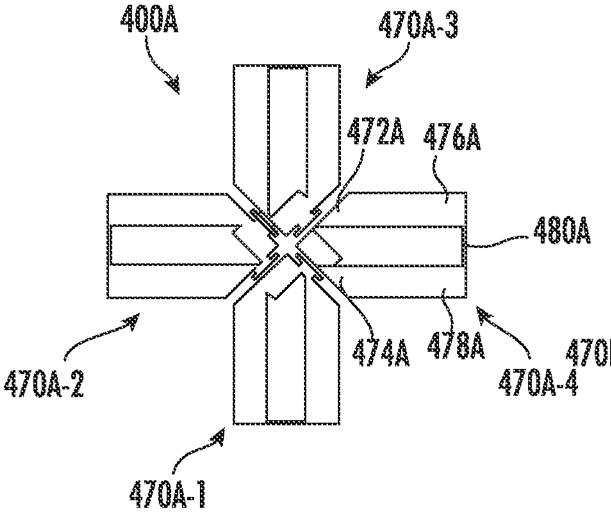
FIGS. 9A-9D are front views of the dipole arms of radiating elements according to four additional embodiments of the present invention.

Referring to FIG. 9A, a radiating element 400A includes four dipole arms 470A-1 through 470A-4. Each dipole arm 470A is planar and includes a first and second inner segments 472A, 474A, and first through third outer segments 476A, 478A, 480A. The five segments of each dipole arm 470A extend from the center of the radiating element 400A at the same angles as the corresponding five segments of each dipole arm 270 of radiating element 200 and likewise form an irregular pentagon shape. The dipole arms 470A differ, however, in that all but the third outer segment 480A of each dipole arm 470A are formed as plate-like structures, and the lengths of the first and second inner segments 472A, 474A are reduced while the lengths of the first and second outer segments 476A, 478A are increased so that the dipole arms 470A are skinnier (i.e., have a larger aspect ratio) as compared to the dipole arms 270 of radiating element 200.

The radiating element 400A may have the same size as the radiating element 200 of FIG. 7A. For example, radiating elements 200 and 400A, when viewed from the front, will both have a width and a height of 172 mm each (i.e., the length of each dipole radiator, which comprises two collinear dipole arms, is 172 mm). The radiating element 400A will exhibit less directivity than the radiating element 200 of FIG. 7A since the current distribution on the dipole arms 470A of radiating element 400A is more concentrated in the center of radiating element 400A, making the overall aperture of radiating element 400A smaller as compared to radiating element 200 which has the currents spreading more towards the corners of an imaginary square surrounding the overall aperture of the radiating element 200.

Figure 9B:
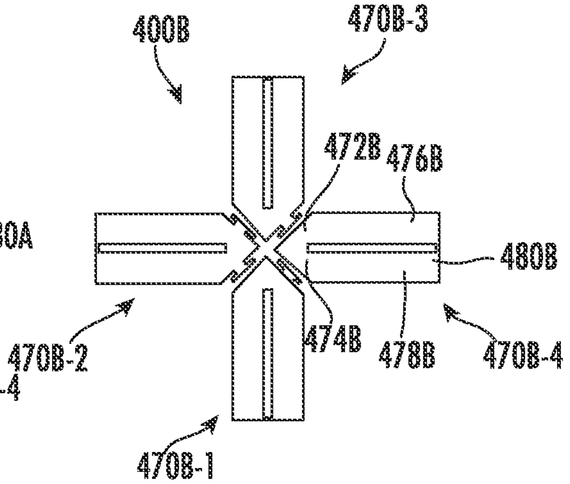

Referring to FIG. 9B, a radiating element 400B includes four dipole arms 470B-1 through 470B-4. Each dipole arm 470B may again be a planar structure and may be very similar to the dipole arms 470A discussed above, with the only difference being that the first and second inner segments 472B, 474B and the third outer segment 480B are shorter segments. As a result of these differences, the first and second outer segments 476B, 478B of radiating element 400B are positioned closer together than the corresponding first and second outer segments 476A, 478A of radiating element 400A. Antennas that include two linear arrays formed using radiating elements 400B may have improved (narrower) azimuth beamwidth performance and reduced coupling between adjacent linear arrays as compared to an antenna that includes two linear arrays formed using radiating elements 400A.

Figure 9C:
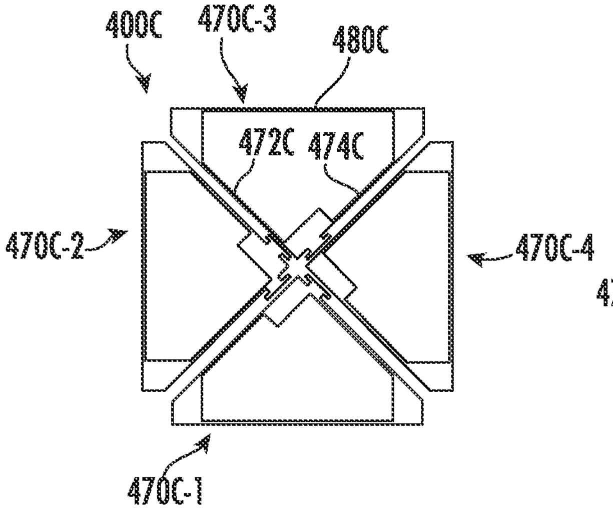

Referring to FIG. 9C, a radiating element 400C includes four dipole arms 470C-1 through 470C-4 that each include first and second inner segments 472C, 474C and a third outer segment 480C that together form a triangular shape as opposed to the irregular pentagon shapes of the dipole arms 270, 470A and 470B discussed above. In the depicted embodiment, the ground connections capacitively couple to the dipole arms at the pads that are provided at the distal ends of the first and second inner segments 472C, 474C, and the center conductor connections capacitively couple to the dipole arms 470C at the pads that are provided at the base ends of the first and second inner segments 472C, 474C of the dipole arms 470C.

Figure 9D:
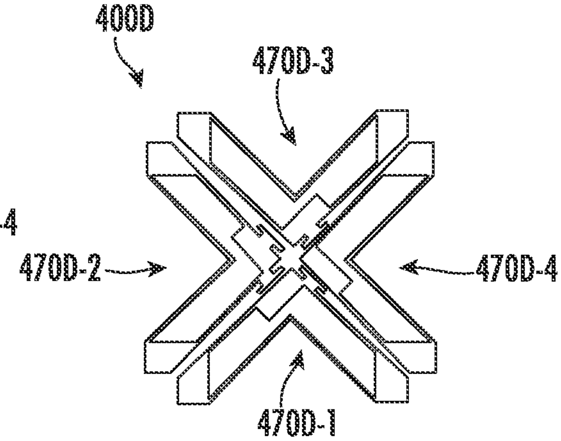

Referring to FIG. 9D, a radiating element 400D includes four dipole arms 470D-1 through 470D-4 that each include a plurality of segments that form a "V" shape as opposed to the irregular pentagon shapes of the dipole arms 270, 470A and 470B discussed above. In the depicted embodiment, the ground connections capacitively couple to the dipole arms at the pads located at the top portions of the V-shape, and the center conductor connections capacitively couple to the dipole arms at the vertex of each V-shaped dipole arm 470D.

Figure 10A:
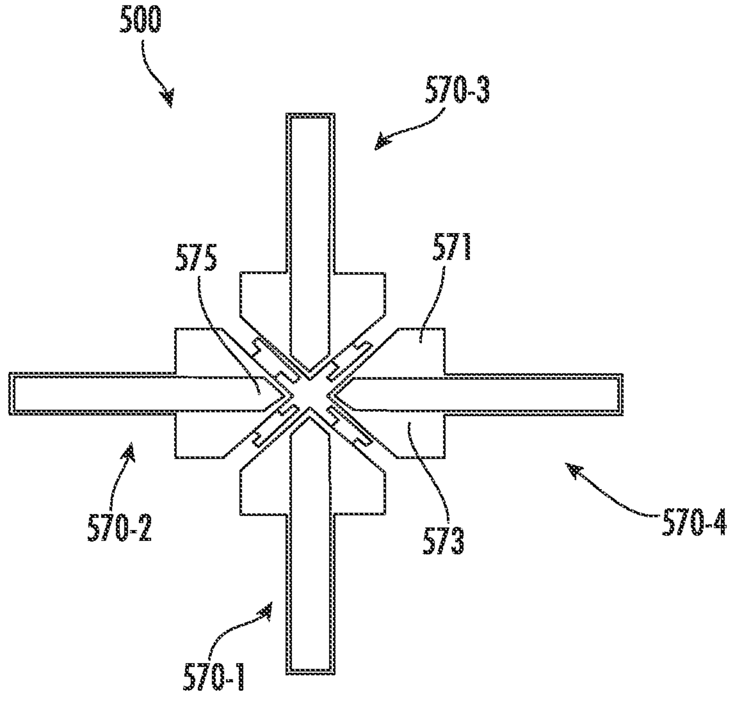
FIG. 10A is a front view of the dipole arms of a radiating element according to another embodiment of the present invention.
Figure 10B:
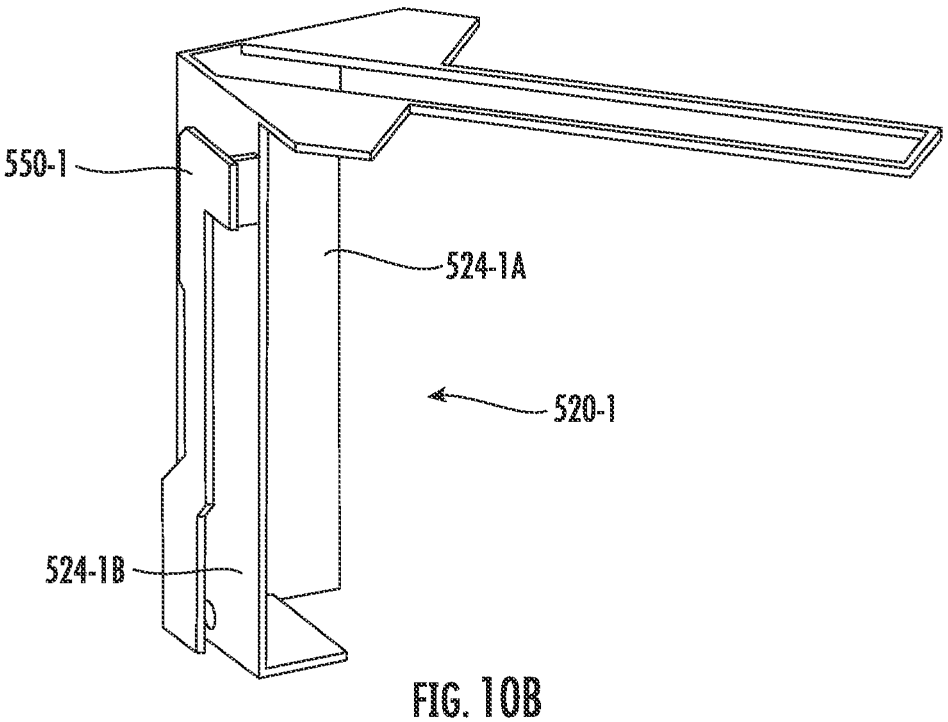
FIG. 10B is a perspective view of one of the four feed stalks of a radiating element that includes the dipole arms shown in FIG. 10A.

FIG. 10A is a front view of the dipole arms 570 of a radiating element 500 according to another embodiment of the present invention. FIG. 10B is a perspective view of one of the four feed stalk members 520-1 of radiating element 500.

As shown in FIG. 10A, each dipole arm 570 may have a generally rectangular shape. Each dipole arm 570 further includes a pair of ground pads 571, 573 and a signal pad 575 that serve as locations where the grounded sheets and feed line of the feed stalk members 520 capacitively couple to the dipole arms 570. Referring to FIG. 10B, the feed stalk 510 for radiating element includes four feed stalk member 520-1 through 520-4, one of which is shown in FIG. 10B. Each feed stalk member 520 may be identical to the corresponding feed stalk members 220 that are discussed above with reference to FIGS. 7A-7D, except that the shape of the distal end of the feed stalk members 220, 520 differ to conform to the shapes of the respective dipole arms 270, 570 mounted thereon, as shown in FIGS. 7A and 10B.

The radiating elements according to embodiments of the present invention that are discussed above with reference to FIGS. 7A-10B each include a feed stalk and a radiator unit having first through fourth dipole arms that are each electrically coupled to the feed stalk. An outer segment of the first dipole arm and an outer segment of the second dipole arm are configured to together form a first radiating structure that radiates at a first polarization, and an outer segment of the third dipole arm and an outer segment of the fourth dipole arm are configured to together form a second radiating structure that radiates at the first polarization, and first and second inner portions of each of the first through fourth dipole arms are configured to together form a third radiating structure that radiates at the first polarization when a first RF signal is fed to the radiating element. The four dipole arms may be arranged to form a cruciform shape. The feed stalks may include first through fourth RF transmission lines or, alternatively, coaxial cables may be connected to the feed stalks that feed the dipole arms without the need for separate RF transmission lines on the feed stalk.

In each of these radiating elements, a portion of the first dipole arm extends adjacent to and in parallel to a portion of the second dipole arm to define a first slot, a portion of the second dipole arm extends adjacent to and in parallel to a portion of the third dipole arm to define a second slot, a portion of the third dipole arm extends adjacent to and in parallel to a portion of the fourth dipole arm to define a third slot, and a portion of the fourth dipole arm extends adjacent to and in parallel to a portion of the first dipole arm to define a fourth slot. The RF transmission lines (or coaxial cables), when excited, are configured to apply voltage differentials across the respective first through fourth slots.

In each of these radiating elements, the first and third dipole arms may be mounted to extend horizontally in front of a reflector of a base station antenna, and the second and fourth dipole arms are mounted to extend vertically in front of the reflector when a longitudinal axis of the reflector extends in a vertical direction. When mounted in this fashion, the first and third slots will extend at an angle of about −45° with respect to the longitudinal axis of the reflector and the second and fourth slots will extend at an angle of about +45° respect to the longitudinal axis of the reflector.

Figure 11A:
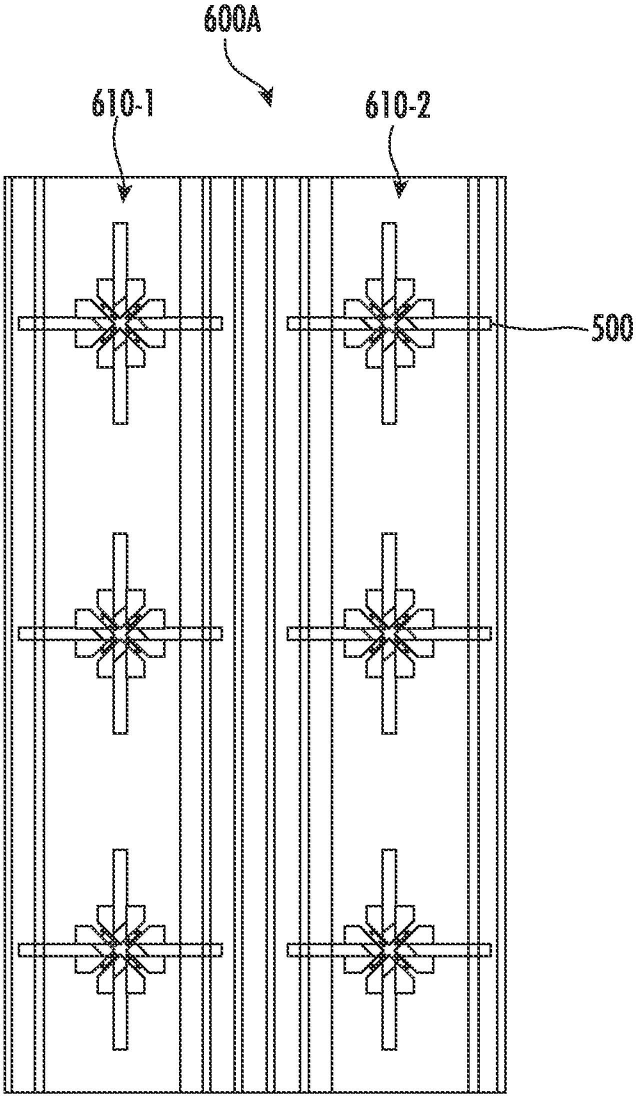
FIGS. 11A-11C are front views of base station antennas that include two arrays of radiating elements according to embodiments of the present invention.
Figure 11B:
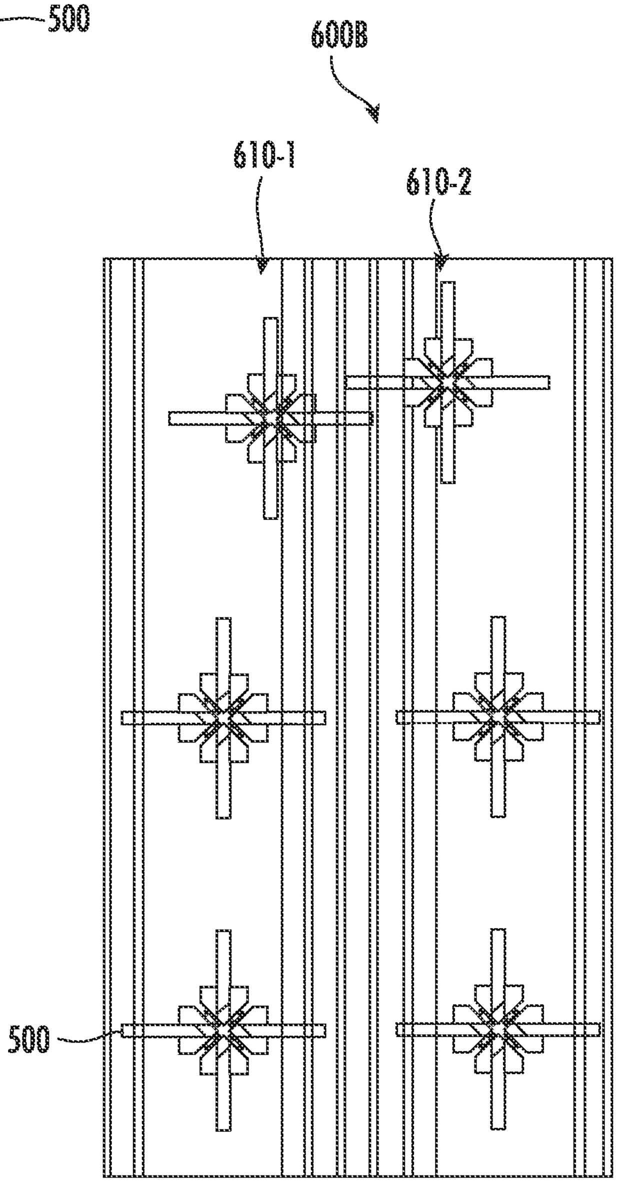
Figure 11C:
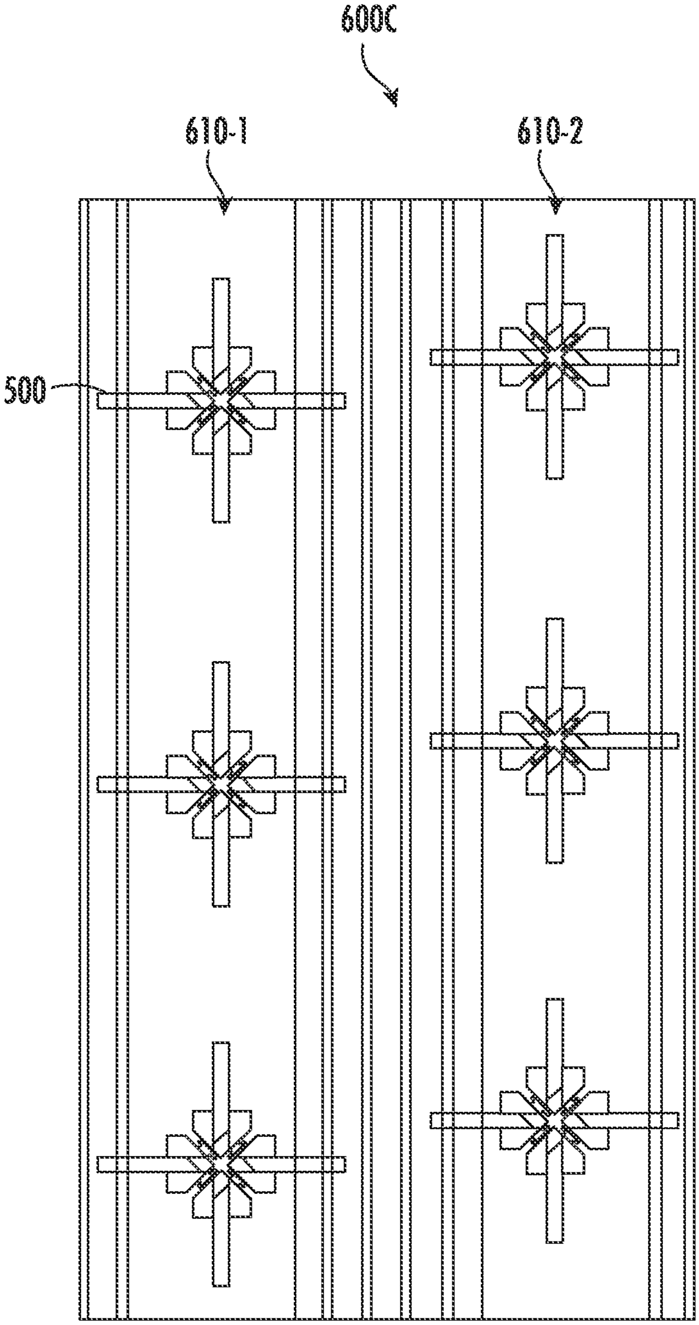

The above described radiating elements may be used in base station antennas. In example embodiments, base station antennas may be provided that include two linear arrays of any of the above-described radiating elements. FIGS. 11A-11C are front views of base station antennas that include two arrays of radiating elements according to embodiments of the present invention.

Referring to FIG. 11A, a base station antenna 600A includes first and second linear arrays 610-1, 610-2 of radiating elements. Each linear array 610 comprises a column of radiating elements 500, where each radiating element 500 in an array 610 is aligned along a vertical axis. The linear arrays 610 may extend along either side of the base station antenna 600A. The radiating elements 500 may be configured to transmit and receive RF signals in some or all of the 617-960 MHz frequency band. The base station antenna 600A may be relatively wide due to the large footprint of each radiating element 500 (e.g., each radiating element may have a width and a height of 172 mm) and due to the separation between the two linear arrays 610-1, 610-2, which reduces cross-coupling between the two linear arrays 610-1, 610-2.

In an effort to reduce the width of the base station antenna 600A, the length of each dipole arm 570 of the radiating elements 500 may be kept as small as possible. As a result, the azimuth beamwidth of the antenna beams generated by the linear arrays 610 may be somewhat large, particularly at the lower end of the 617-960 MHz operating frequency band. This may result in reduced directivity within a sector served by the base station antenna 600 and may also result in increased interference with adjoining sectors.

FIG. 11B depicts a base station antenna 600B that is a variant of base station antenna 600A of FIG. 11A. As shown in FIG. 11B, the azimuth beamwidth of each linear array 610 may be reduced by horizontally offsetting one or more of the radiating elements 500 in the array from other of the radiating elements 500 in the linear array 610. In the depicted embodiment, the top radiating element 500 in linear array 610-1 is moved inwardly toward the center of the antenna 600B so that it is horizontally offset with respect to the other two radiating elements 500 in linear array 610-1. Since the radiating elements 500 in linear array 610-1 are no longer aligned along a vertical axis, the azimuth beamwidth of the antenna beams formed by linear array 610-1 may be narrowed. Likewise, the top radiating element 500 in linear array 610-2 is moved inwardly toward the center of the antenna 600B so that it is horizontally offset with respect to the other two radiating elements 500 in linear array 610-2. This acts to narrow the azimuth beamwidth of the antenna beams formed by linear array 610-2. As is further shown in FIG. 11B, the top radiating element 500 in linear array 610-1 may be moved downward slightly from the position of the corresponding radiating element 500 in the base station antenna 600A of FIG. 11A, and the top radiating element 500 in linear array 610-2 may be moved upward slightly from the position of the corresponding radiating element 500 in the base station antenna 600A of FIG. 11A. This increase the physical distance between the top two radiating elements 500 of base station antenna 600B, thereby reducing coupling between the two linear arrays 610-1, 610-2.

FIG. 11C is a schematic front view of a base station antenna 600C according to further embodiments of the present invention. Base station antenna 600C again includes first and second linear arrays 610-1, 610-2 of radiating elements 500. As shown in FIG. 11C, the coupling between the two linear arrays 610-1, 610-2 may be reduced by vertically offsetting the radiating elements 500 in the first linear array 610-1 from the radiating elements 500 in the adjacent second linear array 610-2.

The cross-dipole radiating elements according to embodiments of the present invention may be inexpensive to manufacture and simple to assemble.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A radiating element, comprising:

a feed stalk; and a first dipole arm, a second dipole arm, a third dipole arm and a fourth dipole arm that are each electrically coupled to the feed stalk, wherein an outer segment of the first dipole arm and an outer segment of the second dipole arm are configured to together form a first radiating structure that radiates at a first polarization, and an outer segment of the third dipole arm and an outer segment of the fourth dipole arm are configured to together form a second radiating structure that radiates at the first polarization, and first and second inner portions of each of the first through fourth dipole arms are configured to together form a third radiating structure that radiates at the first polarization when a first RF signal is fed to the radiating element.

2. The radiating element of claim 1, wherein the feed stalk includes a first RF transmission line, a second RF transmission line, a third RF transmission line, and a fourth RF transmission line.

3. The radiating element of claim 2, wherein at least a part of each of the first through RF transmission lines comprises a respective stripline segment.

4. The radiating element of claim 1, wherein a portion of the first dipole arm extends adjacent to and in parallel to a portion of the second dipole arm to define a first slot, a portion of the second dipole arm extends adjacent to and in parallel to a portion of the third dipole arm to define a second slot, a portion of the third dipole arm extends adjacent to and in parallel to a portion of the fourth dipole arm to define a third slot, and a portion of the fourth dipole arm extends adjacent to and in parallel to a portion of the first dipole arm to define a fourth slot.

5. The radiating element of claim 4, wherein the first RF transmission line extends directly behind the first slot, the second RF transmission line extends directly behind the second slot, the third RF transmission line extends directly behind the third slot, and the fourth RF transmission line extends directly behind the fourth slot.

6. The radiating element of claim 4, wherein a first conductor of the first RF transmission line capacitively couples to the first dipole arm on a first side of the slot and the second conductor of the first RF transmission line capacitively couples to a second side of the second dipole arm.

7. The radiating element of claim 4, wherein each of the first through fourth RF transmission lines partially crosses behind a respective one of the first through fourth slots within a footprint of the feed stalk when the radiating element is viewed from the front.

8. The radiating element of claim 1 mounted on a reflector of a base station antenna, wherein the first and third dipole arms are mounted to extend horizontally in front of the reflector and the second and fourth dipole arms are mounted to extend vertically in front of the reflector when a longitudinal axis of the reflector extends in a vertical direction.

9. The radiating element of claim 8, wherein the first and third slots extend at an angle of about −45° with respect to the longitudinal axis of the reflector and the second and fourth slots extend at an angle of about +45° respect to the longitudinal axis of the reflector.

10. A radiating element, comprising:

a first dipole arm, a second dipole arm, a third dipole arm and a fourth dipole arm arranged to form a cruciform shape, where first through fourth slots separate each of the first through fourth dipole arms from adjacent ones of the first through fourth dipole arms; and a feed network that includes a first stripline segment, a second stripline segment, a third stripline segment, and a fourth stripline segment;

wherein center conductors of the respective first through fourth stripline segments extend directly behind the respective first through fourth slots.

11. The radiating element of claim 10, wherein the first through fourth dipole arms are capacitively coupled to the center conductors of the respective first through fourth stripline segments, and the first through fourth dipole arms are also capacitively coupled to ground.

12. The radiating element of claim 10 mounted on a reflector of a base station antenna, wherein the first and third dipole arms are mounted to extend horizontally in front of the reflector and the second and fourth dipole arms are mounted to extend vertically in front of the reflector when a longitudinal axis of the reflector extends in a vertical direction.

13. The radiating element of claim 10, wherein the first through fourth dipole arms each include first and second inner segments that together define the first through fourth slots, first and second outer segments that extend outwardly from distal ends of the respective first and second inner segments, and a third outer segment that connects distal ends of the first and second outer segments.

14. The radiating element of claim 13, wherein the first and second outer segments of each of the first through fourth dipole arms extend in parallel to each other.

15. The radiating element of claim 14, wherein the third outer segments of each of the first through fourth dipole arms extends at a 90° angle from the second outer segment.

16. A radiating element, comprising:

a first dipole arm, a second dipole arm, a third dipole arm and a fourth dipole arm;

a feed stalk that includes a first RF transmission line that includes a first microstrip segment and a first stripline segment and a second RF transmission line that includes a second microstrip segment and a second stripline segment, wherein the radiating element is mounted to extend forwardly from a reflector of a base station antenna, and wherein the first and second microstrip segments are behind the reflector and the first and second stripline segments are in front of the reflector.

17. The radiating element of claim 16, further comprising a third RF transmission line that includes a third microstrip segment and a third stripline segment and a fourth RF transmission line that includes a fourth microstrip segment and a fourth stripline segment.

18. The radiating element of claim 17, further comprising a first power divider having a first output that comprises the first microstrip segment and a second output that comprises the second microstrip segment.

19. The radiating element of claim 17, wherein the feed stalk includes four sets of first and second parallel metal plates that form ground conductors of the first through fourth stripline segments.

* * * * *